US012801431B2

(12) United States Patent
Marks et al.

(10) Patent No.: US 12,801,431 B2
(45) Date of Patent: Nov. 17, 2026

(54) DETECTION OF VARIANTS OF AUTOMATABLE TASKS FOR ROBOTIC PROCESS AUTOMATION

(71) Applicant: UiPath, Inc., New York, NY (US)

(72) Inventors: Justin Marks, Redmond, WA (US); Therese Fehrer, Eindhoven (NL); Nataliia Zasoba, Lviv (UA); Charles Park, Bellevue, WA (US); Yunjing Ma, Bellevue, WA (US)

(73) Assignee: UiPath, Inc., New York, NY (US)

( * ) Notice: Subject to any disclaimer, the term of this patent is extended or adjusted under 35 U.S.C. 154(b) by 598 days.

(21) Appl. No.: 18/049,276

(22) Filed: Oct. 24, 2022

(65) Prior Publication Data

US 2024/0134685 A1 Apr. 25, 2024
US 2024/0231896 A9 Jul. 11, 2024

(51) Int. Cl.

| | |
|---|---|
| ***G06F 11/34*** | (2006.01) |
| ***G06F 9/30*** | (2018.01) |
| ***G06F 9/38*** | (2018.01) |
| ***G06F 9/445*** | (2018.01) |
| ***G06F 9/48*** | (2006.01) |
| ***G06N 3/0442*** | (2023.01) |
| ***G06N 3/0464*** | (2023.01) |
| ***G06N 3/047*** | (2023.01) |
| ***G06N 3/048*** | (2023.01) |
| ***G06N 3/0495*** | (2023.01) |
| ***G06N 3/0499*** | (2023.01) |
| ***G06N 3/084*** | (2023.01) |
| ***G06N 3/09*** | (2023.01) |
| ***G06N 7/01*** | (2023.01) |
| ***G06N 20/10*** | (2019.01) |
| ***G06Q 10/10*** | (2023.01) |

(52) U.S. Cl.
CPC .......... *G06F 9/4881* (2013.01); *G06F 9/3005* (2013.01); *G06F 9/3836* (2013.01); *G06F 9/4451* (2013.01)

(58) Field of Classification Search
None
See application file for complete search history.

(56) References Cited

U.S. PATENT DOCUMENTS 10,613,838 B2 4/2020 Kim et al.
11,107,090 B2 8/2021 Ramamurthy et al.
11,281,936 B2 3/2022 Ma et al.
(Continued)

FOREIGN PATENT DOCUMENTS

CN 110785736 A 2/2020

OTHER PUBLICATIONS

Non-Final Office Action mailed May 15, 2025, in connection with U.S. Appl. No. 18/069,330, filed Dec. 21, 2022, 17 pgs.

*Primary Examiner* — Mustafa A Amin
(74) *Attorney, Agent, or Firm* — Chiesa Shahinian & Giantomasi PC

(57) ABSTRACT

Systems and methods are provided for determining variants of an automatable task. Task flow data of a performance of an automatable task by one or more users is received. The task flow data is generated based on user input using task mining. User interaction data is identified from the task flow data. One or more variants of the automatable task are determined based on the user interaction data using a machine learning based model. The one or more variants of the automatable task are output.

18 Claims, 15 Drawing Sheets

(56) References Cited

U.S. PATENT DOCUMENTS

| | | | | |
|---|---|---|---|---|
| 2018/0074931 | A1* | 3/2018 | Garcia | G06F 11/3409 |
| 2018/0284709 | A1* | 10/2018 | Dubey | G05B 19/042 |
| 2019/0250891 | A1 | 8/2019 | Kumar et al. | |
| 2019/0317803 | A1 | 10/2019 | Maheshwari et al. | |
| 2019/0324781 | A1 | 10/2019 | Ramamurthy et al. | |
| 2020/0050983 | A1 | 2/2020 | Balasubramanian et al. | |
| 2020/0219033 | A1 | 7/2020 | Smutko et al. | |
| 2020/0233707 | A1* | 7/2020 | Ramamurthy | G06F 9/5066 |
| 2021/0110318 | A1* | 4/2021 | Singh | G06Q 10/04 |
| 2021/0158268 | A1 | 5/2021 | Berg et al. | |
| 2021/0256681 | A1* | 8/2021 | Segal | G06N 3/045 |
| 2022/0326823 | A1* | 10/2022 | Fang | G06F 3/0481 |
| 2022/0350860 | A1* | 11/2022 | Walia | G06F 40/143 |
| 2022/0382979 | A1 | 12/2022 | Klein et al. | |
| 2022/0394049 | A1* | 12/2022 | Abrahamian | G06F 40/134 |
| 2023/0074706 | A1 | 3/2023 | Xiao et al. | |
| 2024/0046180 | A1* | 2/2024 | Ma | G06F 18/23213 |
| 2024/0303100 | A1* | 9/2024 | Nychis | G06F 9/453 |

* cited by examiner

300

800

900

1010

1012

1100

DETECTION OF VARIANTS OF AUTOMATABLE TASKS FOR ROBOTIC PROCESS AUTOMATION

FIELD

The present invention generally relates to automation, and more specifically, to detection of variants of automatable tasks for robotic process automation (RPA).

BACKGROUND

Robotic process automation (RPA) is a form of process automation that uses software robots to automate tasks. RPA may be implemented to automate repetitive and/or labor-intensive tasks, thereby reducing costs and increasing efficiency. One approach for discovering automatable tasks is task mining, which is performed by monitoring and recording the user interface that a user is interacting with to automatically discover automatable tasks. However, conventional task mining is a passive application that does not allow for user input during the recording to enable a user to provide additional content or augmentation. Another approach for discovering automatable tasks is task capture, which is performed by a user manually recording the user's interaction with the user interface while the user performs the automatable task. However, conventional task capture requires user input to manually record performance of the task and does not determine variants of the automatable task.

SUMMARY

Certain embodiments of the present invention may provide alternatives or solutions to the problems and needs in the art that have not yet been fully identified, appreciated, or solved by current task discovery technologies. For example, embodiments described herein bridge the gap between process capture and task mining to provide for discovery of variants of automatable tasks captured from a user.

In accordance with one embodiment, systems and methods are provided for determining variants of an automatable task. Task flow data of a performance of an automatable task by one or more users is received. The task flow data is generated based on user input using task mining. User interaction data is identified from the task flow data. One or more variants of the automatable task are determined based on the user interaction data using a machine learning based model. The one or more variants of the automatable task are output.

In one embodiment, the task flow data is generated by recording the performance of the automatable task by the one or more users using task capture and processing the recorded performance using task mining to generate the task flow data. In another embodiment, the task flow data is generated using task mining with user input to define start and stop points. The task flow data may comprise one or more sequences of screenshots depicting interactions with a user interface by the one or more users.

In one embodiment, user interaction data is identified from the task flow data by identifying, from the task flow data, 1) unique screenshots captured during the performance of the automatable task by the one or more users, 2) paths between the unique screenshots taken by the one or more users while the one or more users interacts with the user interface for the performance of the automatable task, and 3) actions by the one or more users during the performance of the automatable task. The user interaction data may be identified from the task flow data based on optical character recognition and computer vision.

In one embodiment, measures of interest associated with the performance of the automatable task and the one or more variants of the automatable task are determined based on the user interaction data using a machine learning based model. The measures of interest may comprise one or more of a number of times the automatable task and the one or more variants of the automatable task are performed, a number of users that performs the automatable task and the one or more variants of the automatable task, steps and actions involved in performing the automatable task and the one or more variants of the automatable task, or an estimated average time to complete the automatable task and the one or more variants of the automatable task.

In one embodiment, one or more of the automatable task and the one or more variants of the automatable task are automatically performed using robotic process automation.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Embodiments described herein relate to detection of variants of automatable tasks. In particular, embodiments described herein provide for the detection of variants of automatable tasks from task flow data generated using aspects of both task mining and task capture. In task mining, automatable processes are automatically discovered by monitoring and recording user interaction with a user interface. In task capture, automatable processes are manually recorded by a user by recording the user's interaction with a user interface while the user performs the automatable task. Variants of the task detected in accordance with embodiments described herein may be automatically performed, for example, using robotic process automation (RPA). Implementation details of the present invention will first be described with respect to FIGS. 1-7 in accordance with one or more embodiments before details on specific embodiments of the present invention are described.

Figure 1:
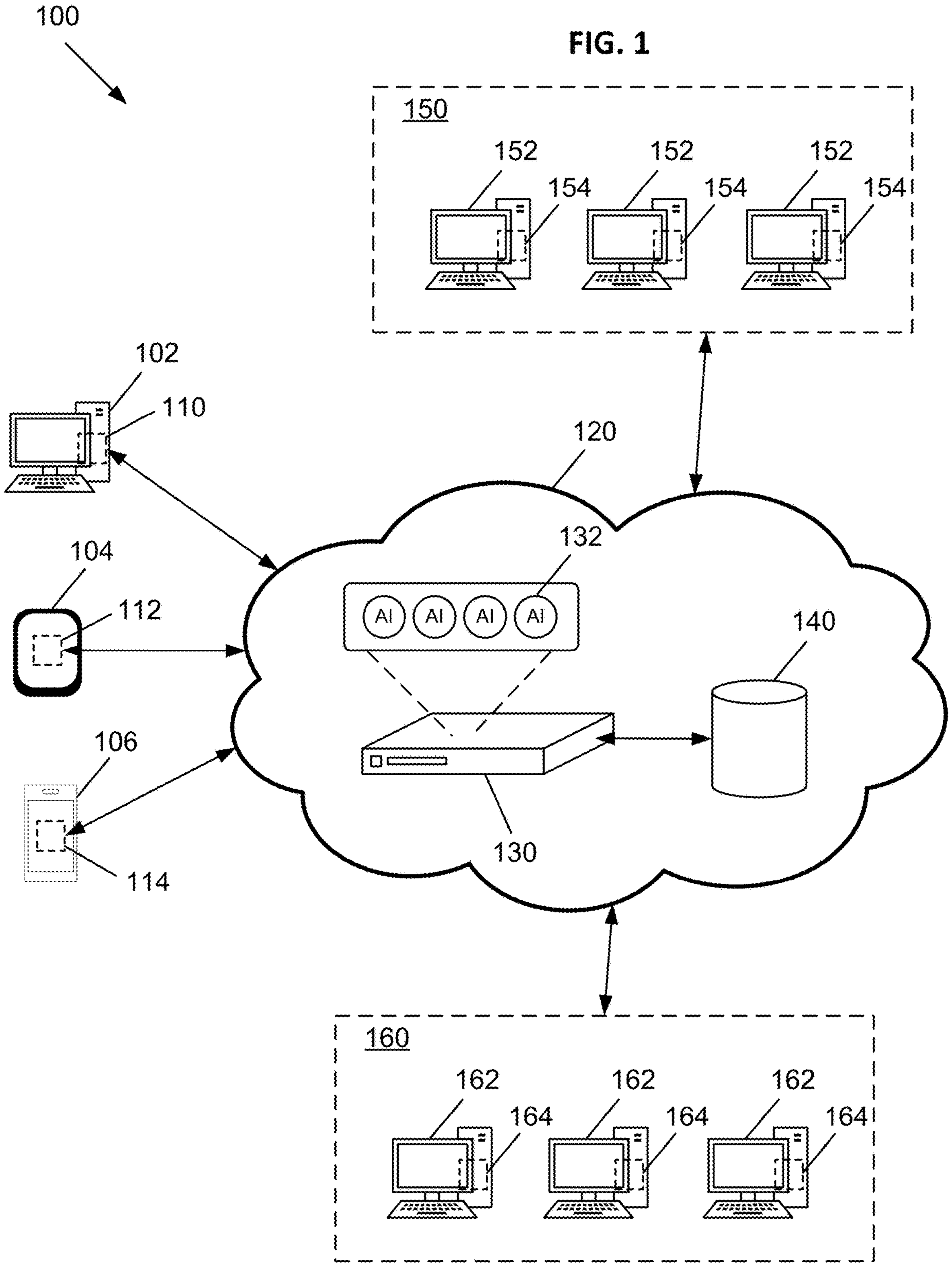
FIG. 1 is an architectural diagram illustrating a hyper-automation system, according to an embodiment of the present invention.

FIG. 1 is an architectural diagram illustrating a hyper-automation system 100, according to an embodiment of the present invention. "Hyper-automation," as used herein, refers to automation systems that bring together components of process automation, integration tools, and technologies that amplify the ability to automate work. For instance, RPA may be used at the core of a hyper-automation system in some embodiments, and in certain embodiments, automation capabilities may be expanded with artificial intelligence (AI)/machine learning (ML), process mining, analytics, and/or other advanced tools. As the hyper-automation system learns processes, trains AI/ML models, and employs analytics, for example, more and more knowledge work may be automated, and computing systems in an organization, e.g., both those used by individuals and those that run autonomously, may all be engaged to be participants in the hyper-automation process. Hyper-automation systems of some embodiments allow users and organizations to efficiently and effectively discover, understand, and scale automations.

Hyper-automation system 100 includes user computing systems, such as desktop computer 102, tablet 104, and smart phone 106. However, any desired user computing system may be used without deviating from the scope of the invention including, but not limited to, smart watches, laptop computers, servers, Internet-of-Things (IoT) devices, etc. Also, while three user computing systems are shown in FIG. 1, any suitable number of user computing systems may be used without deviating from the scope of the invention. For instance, in some embodiments, dozens, hundreds, thousands, or millions of user computing systems may be used. The user computing systems may be actively used by a user or run automatically without much or any user input.

Each user computing system 102, 104, 106 has respective automation process(es) 110, 112, 114 running thereon. Automation process(es) 110, 112, 114 may include, but are not limited to, RPA robots, part of an operating system, downloadable application(s) for the respective computing system, any other suitable software and/or hardware, or any combination of these without deviating from the scope of the invention. In some embodiments, one or more of process(es) 110, 112, 114 may be listeners. Listeners may be RPA robots, part of an operating system, a downloadable application for the respective computing system, or any other software and/or hardware without deviating from the scope of the invention. Indeed, in some embodiments, the logic of the listener(s) is implemented partially or completely via physical hardware.

Listeners monitor and record data pertaining to user interactions with respective computing systems and/or operations of unattended computing systems and send the data to a core hyper-automation system 120 via a network (e.g., a local area network (LAN), a mobile communications network, a satellite communications network, the Internet, any combination thereof, etc.). The data may include, but is not limited to, which buttons were clicked, where a mouse was moved, the text that was entered in a field, that one window was minimized and another was opened, the application associated with a window, etc. In certain embodiments, the data from the listeners may be sent periodically as part of a heartbeat message. In some embodiments, the data may be sent to core hyper-automation system 120 once a predetermined amount of data has been collected, after a predetermined time period has elapsed, or both. One or more servers, such as server 130, receive and store data from the listeners in a database, such as database 140.

Automation processes may execute the logic developed in workflows during design time. In the case of RPA, workflows may include a set of steps, defined herein as "activities," that are executed in a sequence or some other logical flow. Each activity may include an action, such as clicking a button, reading a file, writing to a log panel, etc. In some embodiments, workflows may be nested or embedded.

Long-running workflows for RPA in some embodiments are master projects that support service orchestration, human intervention, and long-running transactions in unattended environments. See, for example, U.S. Pat. No. 10,860,905, which is hereby incorporated by reference in its entirety. Human intervention comes into play when certain processes require human inputs to handle exceptions, approvals, or validation before proceeding to the next step in the activity. In this situation, the process execution is suspended, freeing up the RPA robots until the human task completes.

A long-running workflow may support workflow fragmentation via persistence activities and may be combined with invoke process and non-user interaction activities, orchestrating human tasks with RPA robot tasks. In some embodiments, multiple or many computing systems may participate in executing the logic of a long-running workflow. The long-running workflow may run in a session to facilitate speedy execution. In some embodiments, long-running workflows may orchestrate background processes that may contain activities performing Application Programming Interface (API) calls and running in the long-running workflow session. These activities may be invoked by an invoke process activity in some embodiments. A process with user interaction activities that runs in a user session may be called by starting a job from a conductor activity (conductor described in more detail later herein). The user may interact through tasks that require forms to be completed in the conductor in some embodiments. Activities may be included that cause the RPA robot to wait for a form task to be completed and then resume the long-running workflow.

One or more of automation process(es) 110, 112, 114 is in communication with core hyper-automation system 120. In some embodiments, core hyper-automation system 120 may run a conductor application on one or more servers, such as server 130. While one server 130 is shown for illustration purposes, multiple or many servers that are proximate to one another or in a distributed architecture may be employed without deviating from the scope of the invention. For instance, one or more servers may be provided for conductor functionality, AI/ML model serving, authentication, governance, and/or any other suitable functionality without deviating from the scope of the invention. In some embodiments, core hyper-automation system 120 may incorporate or be part of a public cloud architecture, a private cloud architecture, a hybrid cloud architecture, etc. In certain embodiments, core hyper-automation system 120 may host multiple software-based servers on one or more computing systems, such as server 130. In some embodiments, one or more servers of core hyper-automation system 120, such as server 130, may be implemented via one or more virtual machines (VMs).

In some embodiments, one or more of automation process (es) 110, 112, 114 may call one or more AI/IL models 132 deployed on or accessible by core hyper-automation system 120. AI/ML models 132 may be trained for any suitable purpose without deviating from the scope of the invention, as will be discussed in more detail later herein. Two or more of AI/ML models 132 may be chained in some embodiments (e.g., in series, in parallel, or a combination thereof) such that they collectively provide collaborative output(s). AI/ML models 132 may perform or assist with computer vision (CV), optical character recognition (OCR), document processing and/or understanding, semantic learning and/or analysis, analytical predictions, process discovery, task mining, testing, automatic RPA workflow generation, sequence extraction, clustering detection, audio-to-text translation, any combination thereof, etc. However, any desired number and/or type(s) of AI/ML models may be used without deviating from the scope of the invention. Using multiple AI/ML models may allow the system to develop a global picture of what is happening on a given computing system, for example. For instance, one AI/ML model could perform OCR, another could detect buttons, another could compare sequences, etc. Patterns may be determined individually by an AI/ML model or collectively by multiple AI/ML models. In certain embodiments, one or more AI/ML models are deployed locally on at least one of computing systems 102, 104, 106.

In some embodiments, multiple AI/ML models 132 may be used. Each AI/ML model 132 is an algorithm (or model) that runs on the data, and the AI/ML model itself may be a deep learning neural network (DLNN) of trained artificial "neurons" that are trained on training data, for example. In some embodiments, AI/ML models 132 may have multiple layers that perform various functions, such as statistical modeling (e.g., hidden Markov models (HMMs)), and utilize deep learning techniques (e.g., long short term memory (LS™) deep learning, encoding of previous hidden states, etc.) to perform the desired functionality.

Hyper-automation system 100 may provide four main groups of functionality in some embodiments: (1) discovery; (2) building automations; (3) management; and (4) engagement. Automations (e.g., run on a user computing system, a server, etc.) may be run by software robots, such as RPA robots, in some embodiments. For instance, attended robots, unattended robots, and/or test robots may be used. Attended robots work with users to assist them with tasks (e.g., via UiPath Assistant™). Unattended robots work independently of users and may run in the background, potentially without user knowledge. Test robots are unattended robots that run test cases against applications or RPA workflows. Test robots may be run on multiple computing systems in parallel in some embodiments.

The discovery functionality may discover and provide automatic recommendations for different opportunities of automations of business processes. Such functionality may be implemented by one or more servers, such as server 130. The discovery functionality may include providing an automation hub, process mining, task mining, and/or task capture in some embodiments. The automation hub (e.g., UiPath Automation Hub™) may provide a mechanism for managing automation rollout with visibility and control. Automation ideas may be crowdsourced from employees via a submission form, for example. Feasibility and return on investment (ROI) calculations for automating these ideas may be provided, documentation for future automations may be collected, and collaboration may be provided to get from automation discovery to build-out faster.

Process mining (e.g., via UiPath Automation Cloud™ and/or UiPath AI Center™) refers to the process of gathering and analyzing the data from applications (e.g., enterprise resource planning (ERP) applications, customer relation management (CRM) applications, email applications, call center applications, etc.) to identify what end-to-end processes exist in an organization and how to automate them effectively, as well as indicate what the impact of the automation will be. This data may be gleaned from user computing systems 102, 104, 106 by listeners, for example, and processed by servers, such as server 130. One or more AI/ML models 132 may be employed for this purpose in some embodiments. This information may be exported to the automation hub to speed up implementation and avoid manual information transfer. The goal of process mining may be to increase business value by automating processes within an organization. Some examples of process mining goals include, but are not limited to, increasing profit, improving customer satisfaction, regulatory and/or contractual compliance, improving employee efficiency, etc.

Task mining or task discovery (e.g., via UiPath Automation Cloud™ and/or UiPath AI Center™) identifies and aggregates workflows (e.g., employee workflows), and then applies AI to expose patterns and variations in day-to-day tasks, scoring such tasks for ease of automation and potential savings (e.g., time and/or cost savings). One or more AI/ML models 132 may be employed to uncover recurring task patterns in the data. Repetitive tasks that are ripe for automation may then be identified. This information may initially be provided by listeners and analyzed on servers of core hyper-automation system 120, such as server 130, in some embodiments. The findings from task mining (e.g., Extensible Application Markup Language (XAML) process data) may be exported to process documents or to a designer application such as UiPath Studio™ to create and deploy automations more rapidly.

Task mining in some embodiments may include taking screenshots with user actions (e.g., mouse click locations, keyboard inputs, application windows and graphical elements the user was interacting with, timestamps for the interactions, etc.), collecting statistical data (e.g., execution time, number of actions, text entries, etc.), editing and annotating screenshots, specifying types of actions to be recorded, etc.

Task capture (e.g., via UiPath Automation Cloud™ and/or UiPath AI Center™) automatically documents attended processes as users work or provides a framework for unattended processes. Such documentation may include desired tasks to automate in the form of process definition documents (PDDs), skeletal workflows, capturing actions for each part of a process, recording user actions and automatically generating a comprehensive workflow diagram including the details about each step, Microsoft Word® documents, XAML files, and the like. Build-ready workflows may be exported directly to a designer application in some embodiments, such as UiPath Studio™. Task capture may simplify the requirements gathering process for both subject matter experts explaining a process and Center of Excellence (CoE) members providing production-grade automations.

Building automations may be accomplished via a designer application (e.g., UiPath Studio™, UiPath StudioX™, or UiPath Web™). For instance, RPA developers of an RPA development facility 150 may use RPA designer applications 154 of computing systems 152 to build and test automations for various applications and environments, such as web, mobile, SAP®, and virtualized desktops. API integration may be provided for various applications, technologies, and platforms. Predefined activities, drag-and-drop modeling, and a workflow recorder, may make automation easier with minimal coding. Document understanding functionality may be provided via Drag-and-drop AI skills for data extraction and interpretation that call one or more AI/ML models 132. Such automations may process virtually any document type and format, including tables, checkboxes, signatures, and handwriting. When data is validated or exceptions are handled, this information may be used to retrain the respective AI/ML models, improving their accuracy over time.

An integration service may allow developers to seamlessly combine user interface (UI) automation with API automation, for example. Automations may be built that require APIs or traverse both API and non-API applications and systems. A repository (e.g., UiPath Object Repository™) or marketplace (e.g., UiPath Marketplace™) for pre-built RPA and AI templates and solutions may be provided to allow developers to automate a wide variety of processes more quickly. Thus, when building automations, hyper-automation system 100 may provide user interfaces, development environments, API integration, pre-built and/or custom-built AI/ML models, development templates, integrated development environments (IDEs), and advanced AI capabilities. Hyper-automation system 100 enables development, deployment, management, configuration, monitoring, debugging, and maintenance of RPA robots in some embodiments, which may provide automations for hyper-automation system 100.

In some embodiments, components of hyper-automation system 100, such as designer application(s) and/or an external rules engine, provide support for managing and enforcing governance policies for controlling various functionality provided by hyper-automation system 100. Governance is the ability for organizations to put policies in place to prevent users from developing automations (e.g., RPA robots) capable of taking actions that may harm the organization, such as violating the E.U. General Data Protection Regulation (GDPR), the U.S. Health Insurance Portability and Accountability Act (HIPAA), third party application terms of service, etc. Since developers may otherwise create automations that violate privacy laws, terms of service, etc. while performing their automations, some embodiments implement access control and governance restrictions at the robot and/or robot design application level. This may provide an added level of security and compliance into the automation process development pipeline in some embodiments by preventing developers from taking dependencies on unapproved software libraries that may either introduce security risks or work in a way that violates policies, regulations, privacy laws, and/or privacy policies. See, for example, U.S. Patent Application Publication No. 2022/0011732, which is hereby incorporated by reference in its entirety.

The management functionality may provide management, deployment, and optimization of automations across an organization. The management functionality may include orchestration, test management, AI functionality, and/or insights in some embodiments. Management functionality of hyper-automation system 100 may also act as an integration point with third-party solutions and applications for automation applications and/or RPA robots. The management capabilities of hyper-automation system 100 may include, but are not limited to, facilitating provisioning, deployment, configuration, queuing, monitoring, logging, and interconnectivity of RPA robots, among other things.

A conductor application, such as UiPath Orchestrator™ (which may be provided as part of the UiPath Automation Cloud™ in some embodiments, or on premises, in VMs, in a private or public cloud, in a Linux™ VM, or as a cloud native single container suite via UiPath Automation Suite™), provides orchestration capabilities to deploy, monitor, optimize, scale, and ensure security of RPA robot deployments. A test suite (e.g., UiPath Test Suite™) may provide test management to monitor the quality of deployed automations. The test suite may facilitate test planning and execution, meeting of requirements, and defect traceability. The test suite may include comprehensive test reporting.

Analytics software (e.g., UiPath Insights™) may track, measure, and manage the performance of deployed automations. The analytics software may align automation operations with specific key performance indicators (KPIs) and strategic outcomes for an organization. The analytics software may present results in a dashboard format for better understanding by human users.

A data service (e.g., UiPath Data Service™) may be stored in database 140, for example, and bring data into a single, scalable, secure place with a drag-and-drop storage interface. Some embodiments may provide low-code or no-code data modeling and storage to automations while ensuring seamless access, enterprise-grade security, and scalability of the data. AI functionality may be provided by an AI center (e.g., UiPath AI Center™), which facilitates incorporation of AI/ML models into automations. Pre-built AI/ML models, model templates, and various deployment options may make such functionality accessible even to those who are not data scientists. Deployed automations (e.g., RPA robots) may call AI/ML models from the AI center, such as AI/ML models 132. Performance of the AI/ML models may be monitored, and be trained and improved using human-validated data, such as that provided by data review center 160. Human reviewers may provide labeled data to core hyper-automation system 120 via a review application 162 on computing systems 164. For instance, human reviewers may validate that predictions by AI/ML models 132 are accurate or provide corrections otherwise. This dynamic input may then be saved as training data for retraining AI/ML models 132, and may be stored in a database such as database 140, for example. The AI center may then schedule and execute training jobs to train the new versions of the AI/ML models using the training data. Both positive and negative examples may be stored and used for retraining of AI/ML models 132.

The engagement functionality engages humans and automations as one team for seamless collaboration on desired processes. Low-code applications may be built (e.g., via UiPath Apps™) to connect browser tabs and legacy software, even that lacking APIs in some embodiments. Applications may be created quickly using a web browser through a rich library of drag-and-drop controls, for instance. An application can be connected to a single automation or multiple automations.

An action center (e.g., UiPath Action Center™) provides a straightforward and efficient mechanism to hand off processes from automations to humans, and vice versa. Humans may provide approvals or escalations, make exceptions, etc. The automation may then perform the automatic functionality of a given workflow.

A local assistant may be provided as a launchpad for users to launch automations (e.g., UiPath Assistant™). This functionality may be provided in a tray provided by an operating system, for example, and may allow users to interact with RPA robots and RPA robot-powered applications on their computing systems. An interface may list automations approved for a given user and allow the user to run them. These may include ready-to-go automations from an automation marketplace, an internal automation store in an automation hub, etc. When automations run, they may run as a local instance in parallel with other processes on the computing system so users can use the computing system while the automation performs its actions. In certain embodiments, the assistant is integrated with the task capture functionality such that users can document their soon-to-be-automated processes from the assistant launchpad.

Chatbots (e.g., UiPath Chatbots™), social messaging applications, an/or voice commands may enable users to run automations. This may simplify access to information, tools, and resources users need in order to interact with customers or perform other activities. Conversations between people may be readily automated, as with other processes. Trigger RPA robots kicked off in this manner may perform operations such as checking an order status, posting data in a CRM, etc., potentially using plain language commands.

End-to-end measurement and government of an automation program at any scale may be provided by hyper-automation system 100 in some embodiments. Per the above, analytics may be employed to understand the performance of automations (e.g., via UiPath Insights™). Data modeling and analytics using any combination of available business metrics and operational insights may be used for various automated processes. Custom-designed and pre-built dashboards allow data to be visualized across desired metrics, new analytical insights to be discovered, performance indicators to be tracked, ROI to be discovered for automations, telemetry monitoring to be performed on user computing systems, errors and anomalies to be detected, and automations to be debugged. An automation management console (e.g., UiPath Automation Ops™) may be provided to manage automations throughout the automation lifecycle. An organization may govern how automations are built, what users can do with them, and which automations users can access.

Hyper-automation system 100 provides an iterative platform in some embodiments. Processes can be discovered, automations can be built, tested, and deployed, performance may be measured, use of the automations may readily be provided to users, feedback may be obtained, AI/ML models may be trained and retrained, and the process may repeat itself. This facilitates a more robust and effective suite of automations.

Figure 2:
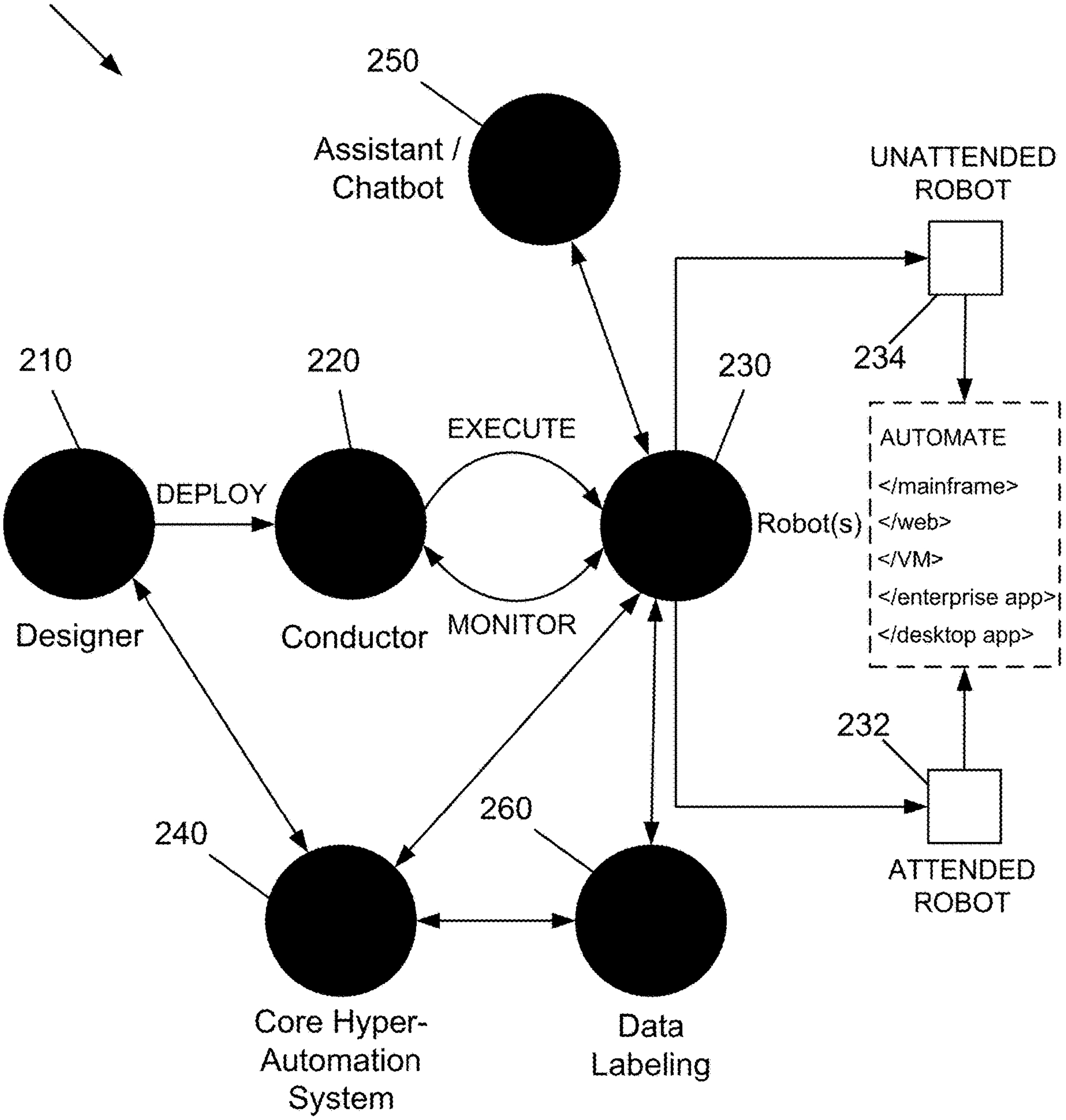
FIG. 2 is an architectural diagram illustrating an RPA system, according to an embodiment of the present invention.

FIG. 2 is an architectural diagram illustrating an RPA system 200, according to an embodiment of the present invention. In some embodiments, RPA system 200 is part of hyper-automation system 100 of FIG. 1. RPA system 200 includes a designer 210 that allows a developer to design and implement workflows. Designer 210 may provide a solution for application integration, as well as automating third-party applications, administrative Information Technology (IT) tasks, and business IT processes. Designer 210 may facilitate development of an automation project, which is a graphical representation of a business process. Simply put, designer 210 facilitates the development and deployment of workflows and robots. In some embodiments, designer 210 may be an application that runs on a user's desktop, an application that runs remotely in a VM, a web application, etc.

The automation project enables automation of rule-based processes by giving the developer control of the execution order and the relationship between a custom set of steps developed in a workflow, defined herein as "activities" per the above. One commercial example of an embodiment of designer 210 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 210, execution of business processes is orchestrated by conductor 220, which orchestrates one or more robots 230 that execute the workflows developed in designer 210. One commercial example of an embodiment of conductor 220 is UiPath Orchestrator™. Conductor 220 facilitates management of the creation, monitoring, and deployment of resources in an environment. Conductor 220 may act as an integration point with third-party solutions and applications. Per the above, in some embodiments, conductor 220 may be part of core hyper-automation system 120 of FIG. 1.

Conductor 220 may manage a fleet of robots 230, connecting and executing robots 230 from a centralized point. Types of robots 230 that may be managed include, but are not limited to, attended robots 232, unattended robots 234, development robots (similar to unattended robots 234, but used for development and testing purposes), and nonproduction robots (similar to attended robots 232, but used for development and testing purposes). Attended robots 232 are triggered by user events and operate alongside a human on the same computing system. Attended robots 232 may be used with conductor 220 for a centralized process deployment and logging medium. Attended robots 232 may help the human user accomplish various tasks, and may be triggered by user events. In some embodiments, processes cannot be started from conductor 220 on this type of robot and/or they cannot run under a locked screen. In certain embodiments, attended robots 232 can only be started from a robot tray or from a command prompt. Attended robots 232 should run under human supervision in some embodiments.

Unattended robots 234 run unattended in virtual environments and can automate many processes. Unattended robots 234 may be responsible for remote execution, monitoring, scheduling, and providing support for work queues. Debugging for all robot types may be run in designer 210 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 220 may have various capabilities including, but not limited to, provisioning, deployment, configuration, queueing, monitoring, logging, and/or providing interconnectivity. Provisioning may include creating and maintenance of connections between robots 230 and conductor 220 (e.g., a web application). Deployment may include assuring the correct delivery of package versions to assigned robots 230 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., a structured query language (SQL) database or a "not only" SQL (NoSQL) database) and/or another storage mechanism (e.g., ElasticSearch®, which provides the ability to store and quickly query large datasets). Conductor 220 may provide interconnectivity by acting as the centralized point of communication for third-party solutions and/or applications.

Robots 230 are execution agents that implement workflows built in designer 210. One commercial example of some embodiments of robot(s) 230 is UiPath Robots™. In some embodiments, robots 230 install the Microsoft Windows® Service Control Manager (SCM)-managed service by default. As a result, such robots 230 can open interactive Windows® sessions under the local system account, and have the rights of a Windows® service.

In some embodiments, robots 230 can be installed in a user mode. For such robots 230, this means they have the same rights as the user under which a given robot 230 has been installed. This feature may also be available for High Density (HD) robots, which ensure full utilization of each machine at its maximum potential. In some embodiments, any type of robot 230 may be configured in an HD environment.

Robots 230 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 220 and the execution hosts (i.e., the computing systems on which robots 230 are executed). These services are trusted with and manage the credentials for robots 230. A console application is launched by the SCM under the local system.

User mode robot services in some embodiments manage and monitor Windows® sessions and act as a proxy between conductor 220 and the execution hosts. User mode robot services may be trusted with and manage the credentials for robots 230. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 230 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 210 may also be independent of browser zoom level in some embodiments. For applications that are DPI-unaware or intentionally marked as unaware, DPI may be disabled in some embodiments.

RPA system 200 in this embodiment is part of a hyperautomation system. Developers may use designer 210 to build and test RPA robots that utilize AI/ML models deployed in core hyper-automation system 240 (e.g., as part of an AI center thereof). Such RPA robots may send input for execution of the AI/ML model(s) and receive output therefrom via core hyper-automation system 240.

One or more of robots 230 may be listeners, as described above. These listeners may provide information to core hyper-automation system 240 regarding what users are doing when they use their computing systems. This information may then be used by core hyper-automation system for process mining, task mining, task capture, etc.

An assistant/chatbot 250 may be provided on user computing systems to allow users to launch RPA local robots. The assistant may be located in a system tray, for example. Chatbots may have a user interface so users can see text in the chatbot. Alternatively, chatbots may lack a user interface and run in the background, listening using the computing system's microphone for user speech.

In some embodiments, data labeling 260 may be performed by a user of the computing system on which a robot is executing or on another computing system that the robot provides information to. For instance, if a robot calls an AI/ML model that performs CV on images for VM users, but the AI/ML model does not correctly identify a button on the screen, the user may draw a rectangle around the misidentified or non-identified component and potentially provide text with a correct identification. This information may be provided to core hyper-automation system 240 and then used later for training a new version of the AI/ML model.

Figure 3:
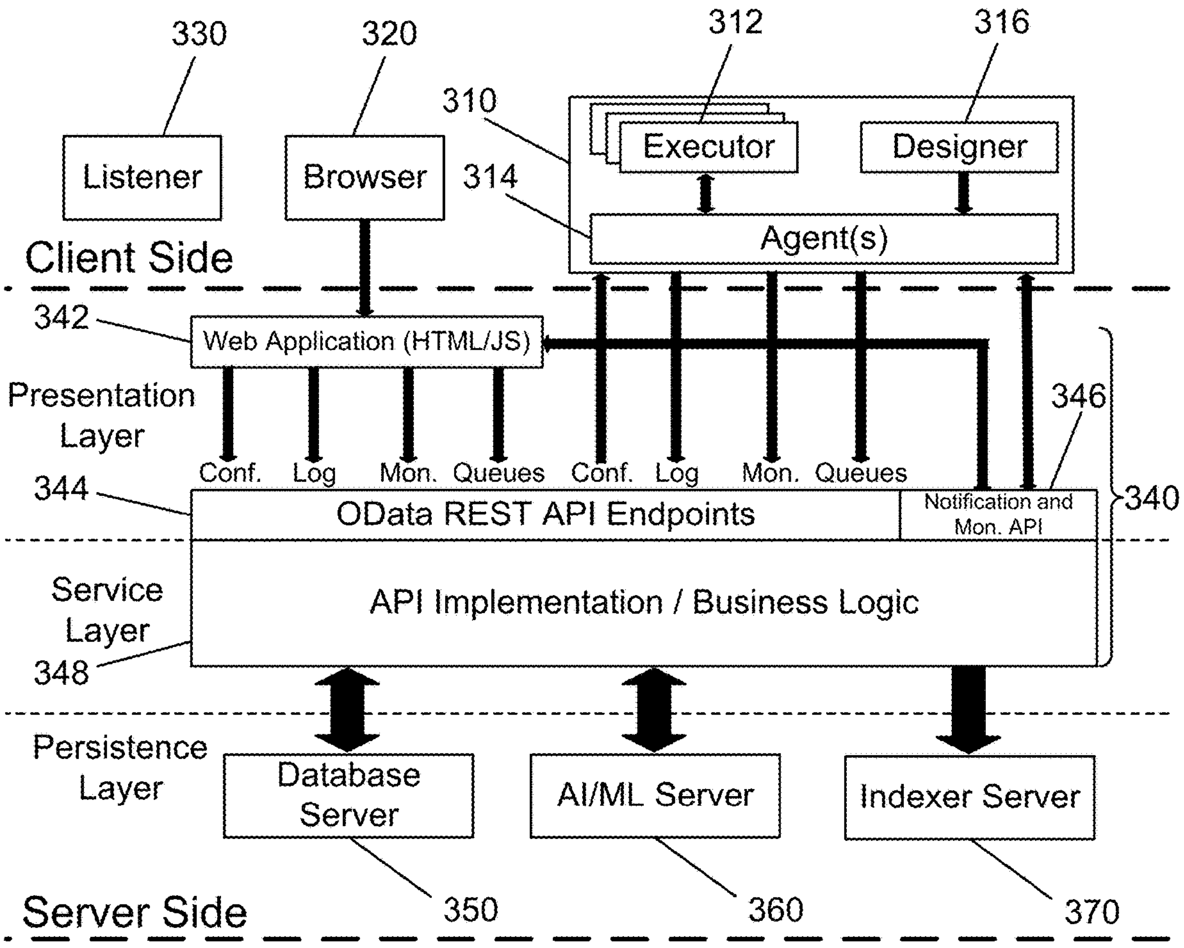
FIG. 3 is an architectural diagram illustrating a deployed RPA system, according to an embodiment of the present invention.

FIG. 3 is an architectural diagram illustrating a deployed RPA system 300, according to an embodiment of the present invention. In some embodiments, RPA system 300 may be a part of RPA system 200 of FIG. 2 and/or hyper-automation system 100 of FIG. 1. Deployed RPA system 300 may be a cloud-based system, an on-premises system, a desktop-based system that offers enterprise level, user level, or device level automation solutions for automation of different computing processes, etc.

It should be noted that the client side, the server side, or both, may include any desired number of computing systems without deviating from the scope of the invention. On the client side, a robot application 310 includes executors 312, an agent 314, and a designer 316. However, in some embodiments, designer 316 may not be running on the same computing system as executors 312 and agent 314. Executors 312 are running processes. Several business projects may run simultaneously, as shown in FIG. 3. Agent 314 (e.g., a Windows® service) is the single point of contact for all executors 312 in this embodiment. All messages in this embodiment are logged into conductor 340, which processes them further via database server 350, an AI/ML server 360, an indexer server 370, or any combination thereof. As discussed above with respect to FIG. 2, executors 312 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 314 is also responsible for sending the status of the robot (e.g., periodically sending a "heartbeat" message indicating that the robot is still functioning) and downloading the required version of the package to be executed. The communication between agent 314 and conductor 340 is always initiated by agent 314 in some embodiments. In the notification scenario, agent 314 may open a WebSocket channel that is later used by conductor 330 to send commands to the robot (e.g., start, stop, etc.).

A listener 330 monitors and records data pertaining to user interactions with an attended computing system and/or operations of an unattended computing system on which listener 330 resides. Listener 330 may be an RPA robot, part of an operating system, a downloadable application for the respective computing system, or any other software and/or hardware without deviating from the scope of the invention. Indeed, in some embodiments, the logic of the listener is implemented partially or completely via physical hardware.

On the server side, a presentation layer (web application 342, Open Data Protocol (OData) Representative State Transfer (REST) Application Programming Interface (API) endpoints 344, and notification and monitoring 346), a service layer (API implementation/business logic 348), and a persistence layer (database server 350, AI/ML server 360, and indexer server 370) are included. Conductor 340 includes web application 342, OData REST API endpoints 344, notification and monitoring 346, and API implementation/business logic 348. In some embodiments, most actions that a user performs in the interface of conductor 340 (e.g., via browser 320) are performed by calling various APIs. Such actions may include, but are not limited to, starting jobs on robots, adding/removing data in queues, scheduling jobs to run unattended, etc. without deviating from the scope of the invention. Web application 342 is the visual layer of the server platform. In this embodiment, web application 342 uses Hypertext Markup Language (HTML) and JavaScript (JS). However, any desired markup languages, script languages, or any other formats may be used without deviating from the scope of the invention. The user interacts with web pages from web application 342 via browser 320 in this embodiment in order to perform various actions to control conductor 340. For instance, the user may create robot groups, assign packages to the robots, analyze logs per robot and/or per process, start and stop robots, etc.

In addition to web application 342, conductor 340 also includes service layer that exposes OData REST API endpoints 344. However, other endpoints may be included without deviating from the scope of the invention. The REST API is consumed by both web application 342 and agent 314. Agent 314 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 340. Queueing REST endpoints may be responsible for queues and queue item management, such as adding data to a queue, obtaining a transaction from the queue, setting the status of a transaction, etc.

Monitoring REST endpoints may monitor web application 342 and agent 314. Notification and monitoring API 346 may be REST endpoints that are used for registering agent 314, delivering configuration settings to agent 314, and for sending/receiving notifications from the server and agent 314. Notification and monitoring API 346 may also use WebSocket communication in some embodiments.

The APIs in the service layer may be accessed through configuration of an appropriate API access path in some embodiments, e.g., based on whether conductor 340 and an overall hyper-automation system have an on-premises deployment type or a cloud-based deployment type. APIs for conductor 340 may provide custom methods for querying stats about various entities registered in conductor 340. Each logical resource may be an OData entity in some embodiments. In such an entity, components such as the robot, process, queue, etc., may have properties, relationships, and operations. APIs of conductor 340 may be consumed by web application 342 and/or agents 314 in two ways in some embodiments: by getting the API access information from conductor 340, or by registering an external application to use the OAuth flow.

The persistence layer includes a trio of servers in this embodiment—database server 350 (e.g., a SQL server), AI/ML server 360 (e.g., a server providing AI/ML model serving services, such as AI center functionality) and indexer server 370. Database server 350 in this embodiment stores the configurations of the robots, robot groups, associated processes, users, roles, schedules, etc. This information is managed through web application 342 in some embodiments. Database server 350 may manage queues and queue items. In some embodiments, database server 350 may store messages logged by the robots (in addition to or in lieu of indexer server 370). Database server 350 may also store process mining, task mining, and/or task capture-related data, received from listener 330 installed on the client side, for example. While no arrow is shown between listener 330 and database 350, it should be understood that listener 330 is able to communicate with database 350, and vice versa in some embodiments. This data may be stored in the form of PDDs, images, XAML files, etc. Listener 330 may be configured to intercept user actions, processes, tasks, and performance metrics on the respective computing system on which listener 330 resides. For example, listener 330 may record user actions (e.g., clicks, typed characters, locations, applications, active elements, times, etc.) on its respective computing system and then convert these into a suitable format to be provided to and stored in database server 350.

AI/ML server 360 facilitates incorporation of AI/ML models into automations. Pre-built AI/ML models, model templates, and various deployment options may make such functionality accessible even to those who are not data scientists. Deployed automations (e.g., RPA robots) may call AI/ML models from AI/ML server 360. Performance of the AI/ML models may be monitored, and be trained and improved using human-validated data. AI/ML server 360 may schedule and execute training jobs to train new versions of the AI/ML models.

AI/ML server 360 may store data pertaining to AI/ML models and ML packages for configuring various ML skills for a user at development time. An ML skill, as used herein, is a pre-built and trained ML model for a process, which may be used by an automation, for example. AI/ML server 360 may also store data pertaining to document understanding technologies and frameworks, algorithms and software packages for various AI/ML capabilities including, but not limited to, intent analysis, natural language processing (NLP), speech analysis, different types of AI/ML models, etc.

Indexer server 370, which is optional in some embodiments, stores and indexes the information logged by the robots. In certain embodiments, indexer server 370 may be disabled through configuration settings. In some embodiments, indexer server 370 uses ElasticSearch®, which is an open source project full-text search engine. Messages logged by robots (e.g., using activities like log message or write line) may be sent through the logging REST endpoint(s) to indexer server 370, where they are indexed for future utilization.

Figure 4:
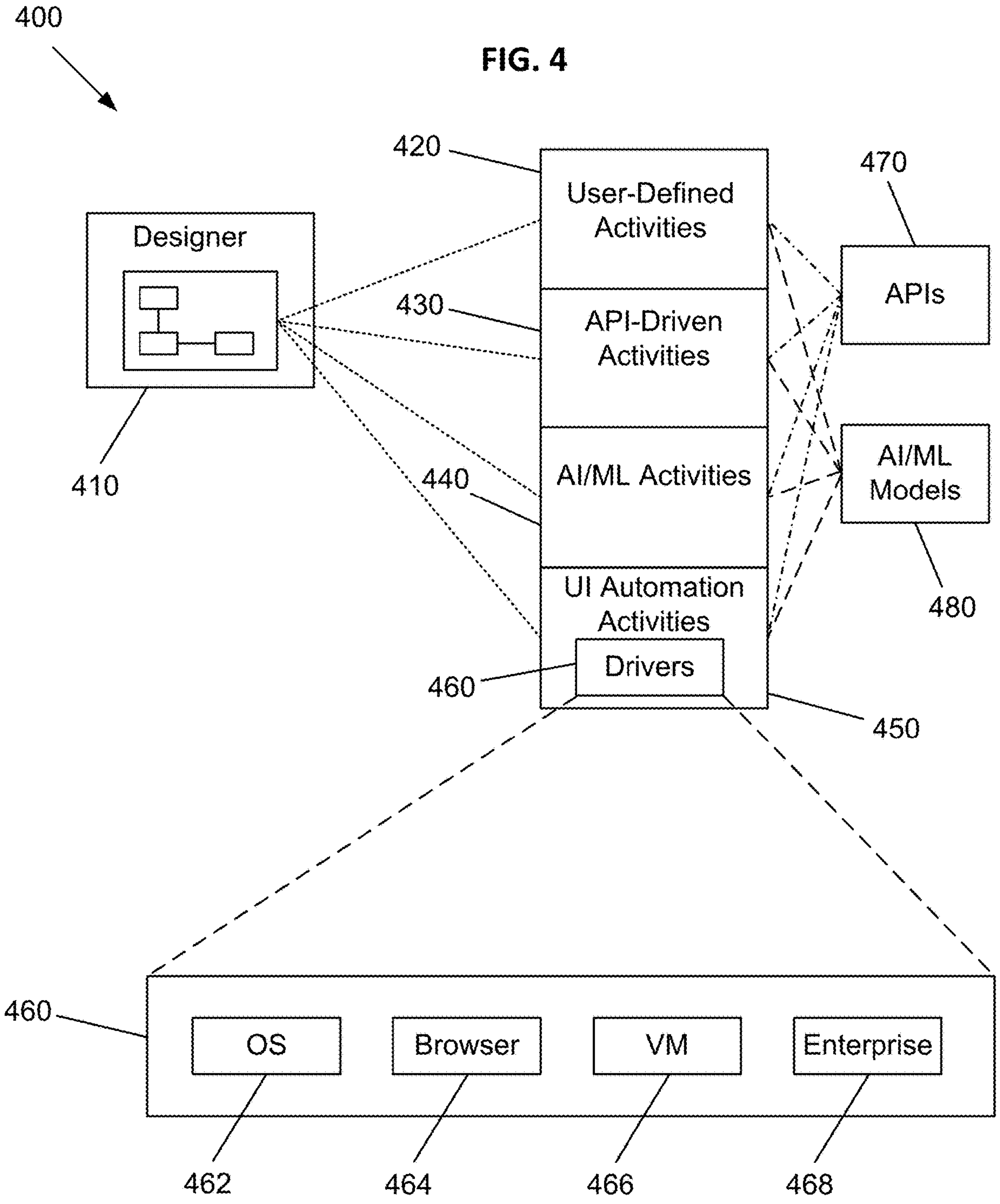
FIG. 4 is an architectural diagram illustrating the relationship between a designer, activities, and drivers, according to an embodiment of the present invention.

FIG. 4 is an architectural diagram illustrating the relationship 400 between a designer 410, activities 420, 430, 440, 450, drivers 460, APIs 470, and AI/ML models 480, according to an embodiment of the present invention. Per the above, a developer uses designer 410 to develop workflows that are executed by robots. The various types of activities may be displayed to the developer in some embodiments. Designer 410 may be local to the user's computing system or remote thereto (e.g., accessed via VM or a local web browser interacting with a remote web server). Workflows may include user-defined activities 420, API-driven activities 430, AI/ML activities 440, and/or and UI automation activities 450. User-defined activities 420 and API-driven activities 440 interact with applications via their APIs. User-defined activities 420 and/or AI/ML activities 440 may call one or more AI/ML models 480 in some embodiments, which may be located locally to the computing system on which the robot is operating and/or remotely thereto.

Some embodiments are able to identify non-textual visual components in an image, which is called CV herein. CV may be performed at least in part by AI/ML model(s) 480. Some CV activities pertaining to such components may include, but are not limited to, extracting of text from segmented label data using OCR, fuzzy text matching, cropping of segmented label data using ML, comparison of extracted text in label data with ground truth data, etc. In some embodiments, there may be hundreds or even thousands of activities that may be implemented in user-defined activities 420. However, any number and/or type of activities may be used without deviating from the scope of the invention.

UI automation activities 450 are a subset of special, lower-level activities that are written in lower-level code and facilitate interactions with the screen. UI automation activities 450 facilitate these interactions via drivers 460 that allow the robot to interact with the desired software. For instance, drivers 460 may include operating system (OS) drivers 462, browser drivers 464, VM drivers 466, enterprise application drivers 468, etc. One or more of AI/ML models 480 may be used by UI automation activities 450 in order to perform interactions with the computing system in some embodiments. In certain embodiments, AI/ML models 480 may augment drivers 460 or replace them completely. Indeed, in certain embodiments, drivers 460 are not included.

Drivers 460 may interact with the OS at a low level looking for hooks, monitoring for keys, etc. via OS drivers 462. Drivers 460 may facilitate integration with Chrome®, IE®, Citrix®, SAP®, etc. For instance, the "click" activity performs the same role in these different applications via drivers 460.

Figure 5:
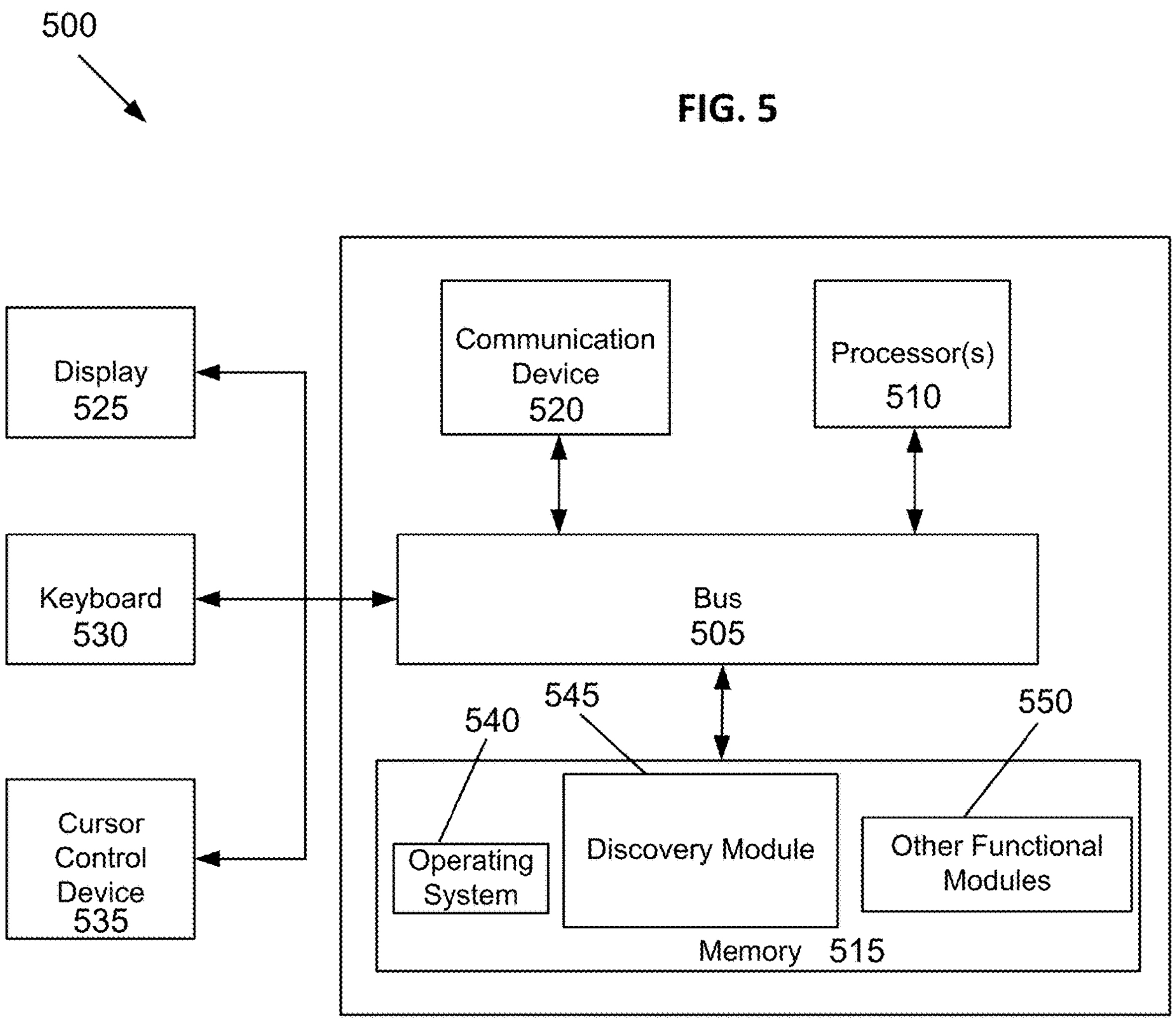
FIG. 5 is an architectural diagram illustrating a computing system configured to determine variants of an automatable task, according to an embodiment of the present invention.

FIG. 5 is an architectural diagram illustrating a computing system 500 configured to discover variants of automatable processes, according to an embodiment of the present invention. In some embodiments, computing system 500 may be one or more of the computing systems depicted and/or described herein. In certain embodiments, computing system 500 may be part of a hyper-automation system, such as that shown in FIGS. 1 and 2. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both. Computing system 500 includes a communication device 520, such as a transceiver, to provide access to a communications network via a wireless and/or wired connection. In some embodiments, communication device 520 may include one or more antennas that are singular, arrayed, phased, switched, beamforming, beamsteering, a combination thereof, and/or any other antenna configuration without deviating from the scope of the invention.

Processor(s) 510 are further coupled via bus 505 to a display 525. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a discovery module 545 that is configured to perform all or part of the processes described herein or derivatives thereof. Computing system 500 may include one or more additional functional modules 550 that include additional functionality.

One skilled in the art will appreciate that a "computing system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6A:
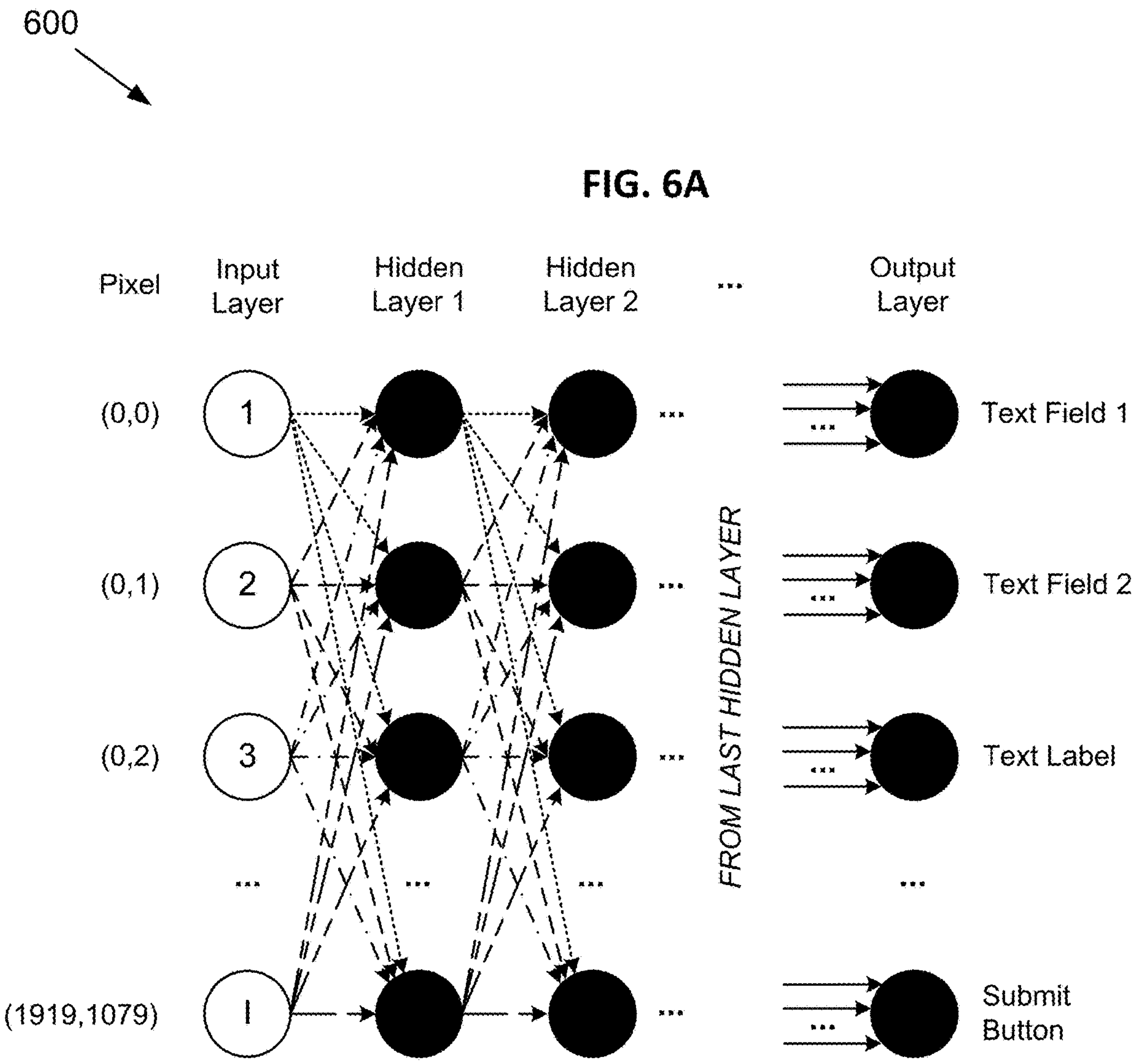
FIG. 6A illustrates an example of a neural network that has been trained to recognize graphical elements in an image, according to an embodiment of the present invention.

Various types of AI/ML models may be trained and deployed without deviating from the scope of the invention. For instance, FIG. 6A illustrates an example of a neural network 600 that has been trained to recognize graphical elements in an image, according to an embodiment of the present invention. Here, neural network 600 receives pixels of a screenshot image of a 1920×1080 screen as input for input "neurons" 1 to I of the input layer. In this case, I is 2,073,600, which is the total number of pixels in the screenshot image.

Neural network 600 also includes a number of hidden layers. Both DLNNs and shallow learning neural networks (SLNNs) usually have multiple layers, although SLNNs may only have one or two layers in some cases, and normally fewer than DLNNs. Typically, the neural network architecture includes an input layer, multiple intermediate layers, and an output layer, as is the case in neural network 600.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs, on the other hand, usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 6A, pixels provided as the input layer are fed as inputs to the J neurons of hidden layer 1. While all pixels are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the invention.

Hidden layer 2 receives inputs from hidden layer 1, hidden layer 3 receives inputs from hidden layer 2, and so on for all hidden layers until the last hidden layer provides its outputs as inputs for the output layer. It should be noted that numbers of neurons I, J, K, and L are not necessarily equal, and thus, any desired number of layers may be used for a given layer of neural network 600 without deviating from the scope of the invention. Indeed, in certain embodiments, the types of neurons in a given layer may not all be the same.

Neural network 600 is trained to assign a confidence score to graphical elements believed to have been found in the image. In order to reduce matches with unacceptably low likelihoods, only those results with a confidence score that meets or exceeds a confidence threshold may be provided in some embodiments. For instance, if the confidence threshold is 80%, outputs with confidence scores exceeding this amount may be used and the rest may be ignored. In this case, the output layer indicates that two text fields, a text label, and a submit button were found. Neural network 600 may provide the locations, dimensions, images, and/or confidence scores for these elements without deviating from the scope of the invention, which can be used subsequently by an RPA robot or another process that uses this output for a given purpose.

It should be noted that neural networks are probabilistic constructs that typically have a confidence score. This may be a score learned by the AI/IL model based on how often a similar input was correctly identified during training. For instance, text fields often have a rectangular shape and a white background. The neural network may learn to identify graphical elements with these characteristics with a high confidence. Some common types of confidence scores include a decimal number between 0 and 1 (which can be interpreted as a percentage of confidence), a number between negative ∞ and positive ∞, or a set of expressions (e.g., “low,” “medium,” and “high”). Various post-processing calibration techniques may also be employed in an attempt to obtain a more accurate confidence score, such as temperature scaling, batch normalization, weight decay, negative log likelihood (NLL), etc.

“Neurons” in a neural network are mathematical functions that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 6B:
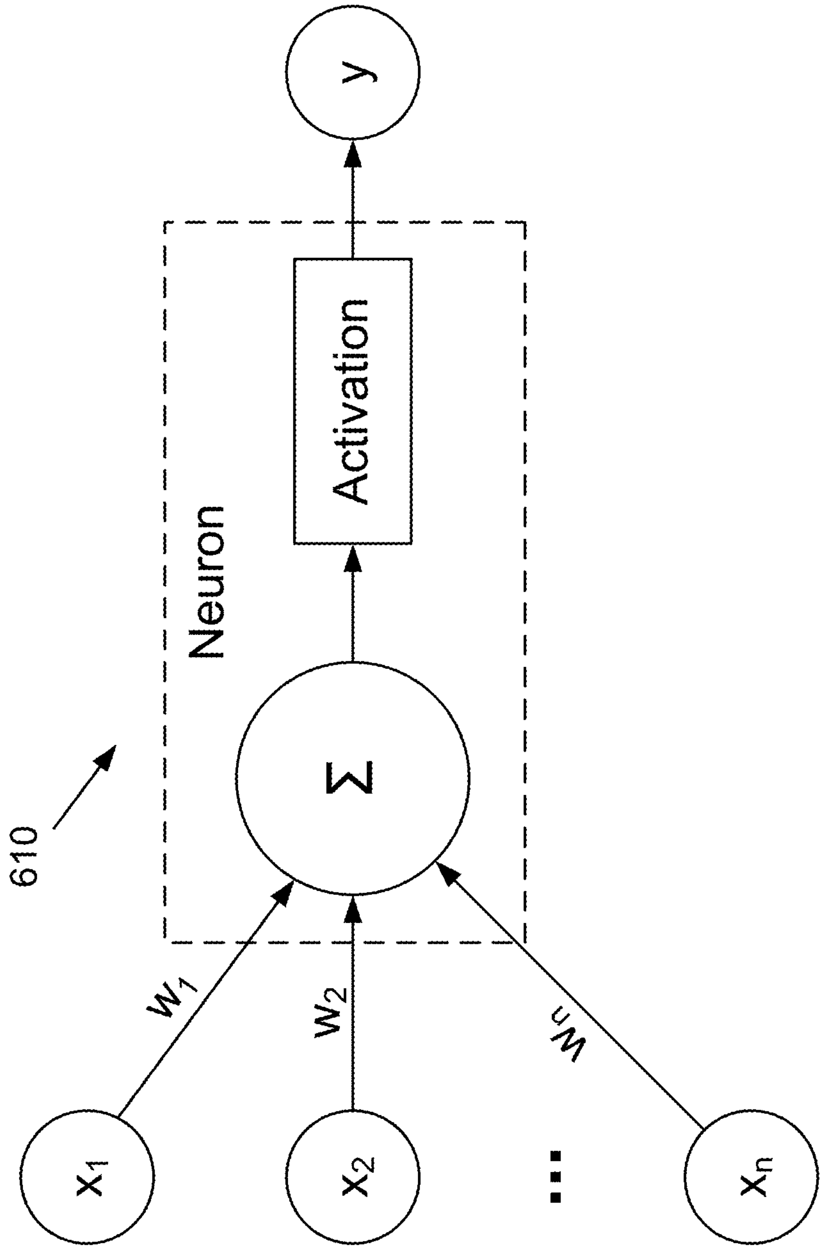
FIG. 6B illustrates an example of a neuron, according to an embodiment of the present invention.

An example of a neuron 610 is shown in FIG. 6B. Inputs $x_1, x_2, \ldots, x_n$ from a preceding layer are assigned respective weights $w_1, w_2, \ldots, w_n$. Thus, the collective input from preceding neuron 1 is $w_1x_1$. These weighted inputs are used for the neuron's summation function modified by a bias, such as:

$$\sum_{i=1}^{m}(w_i x_i) + \text{bias} \tag{1}$$

This summation is compared against an activation function $f(x)$ to determine whether the neuron “fires”. For instance, $f(x)$ may be given by:

$$f(x) = \begin{cases} 1 \text{ if } \sum wx + \text{bias} \geq 0 \\ 0 \text{ if } \sum wx + \text{bias} < 0 \end{cases} \tag{2}$$

The output y of neuron 710 may thus be given by:

$$y = f(x)\sum_{i=1}^{m}(w_i x_i) + \text{bias} \tag{3}$$

In this case, neuron 610 is a single-layer perceptron. However, any suitable neuron type or combination of neuron types may be used without deviating from the scope of the invention. It should also be noted that the ranges of values of the weights and/or the output value(s) of the activation function may differ in some embodiments without deviating from the scope of the invention.

The goal, or “reward function” is often employed, such as for this case the successful identification of graphical elements in the image. A reward function explores intermediate transitions and steps with both short-term and long-term rewards to guide the search of a state space and attempt to achieve a goal (e.g., successful identification of graphical elements, successful identification of a next sequence of activities for an RPA workflow, etc.).

During training, various labeled data (in this case, images) are fed through neural network 600. Successful identifications strengthen weights for inputs to neurons, whereas unsuccessful identifications weaken them. A cost function, such as mean square error (MSE) or gradient descent may be used to punish predictions that are slightly wrong much less than predictions that are very wrong. If the performance of the AI/ML model is not improving after a certain number of training iterations, a data scientist may modify the reward function, provide indications of where non-identified graphical elements are, provide corrections of misidentified graphical elements, etc.

Backpropagation is a technique for optimizing synaptic weights in a feedforward neural network. Backpropagation may be used to “pop the hood” on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights so as to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer i=1, . . . , N of the network, with the output at a given layer first multiplied by a synaptic matrix $W_i$, and with a bias vector $b_i$ added. The network output o, given by $$o = f_N(W_N f_{N-1}(W_{N-1} f_{N-2}( \ldots f_1(W_1 x + b_1) \ldots ) + b_{N-1}) + b_N) \tag{4}$$

In some embodiments, o is compared with a target output t, resulting in an error $$E = \frac{1}{2}\|o - t\|^2,$$

which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o−t. This global error is then propagated backwards giving local errors for weight updates with computations similar to, but not exactly the same as, those used for forward propagation. In particular, the backpropagation step typically requires an activity function of the form $p_j(n_j)=f_j'(n_j)$, where $n_j$ is the network activity at layer j (i.e., $n_j=W_j o_{j-1}+b_j$) where $o_j=f_j(n_j)$ and the apostrophe ' denotes the derivative of the activity function $f$.

The weight updates may be computed via the formulae:

$$d_j = \begin{cases} (o-t)\circ p_j(n_j), & j = N \\ W_{j+1}^T d_{j+1} \circ p_j(n_j), & j < N \end{cases} \tag{5}$$

$$\frac{\partial E}{\partial W_{j+1}} = d_{j+1}(o_j)^T \tag{6}$$

$$\frac{\partial E}{\partial b_{j+1}} = d_{j+1} \tag{7}$$

$$W_j^{new} = W_j^{old} - \eta \frac{\partial E}{\partial W_j} \tag{8}$$

$$b_j^{new} = b_j^{old} - \eta \frac{\partial E}{\partial b_j} \tag{9}$$

where ∘ denotes a Hadamard product (i.e., the element-wise product of two vectors), $^T$ denotes the matrix transpose, and $o_j$ denotes $f_j(W_j o_{j-1}+b_j)$, with $o_0$=x. Here, the learning rate η is chosen with respect to machine learning considerations. Below, η is related to the neural Hebbian learning mechanism used in the neural implementation. Note that the synapses W and b can be combined into one large synaptic matrix, where it is assumed that the input vector has appended ones, and extra columns representing the b synapses are subsumed to W.

The AI/ML model may be trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the invention. Once trained on the training data, the AI/ML model may be tested on a set of evaluation data that the AI/ML model has not encountered before. This helps to ensure that the AI/ML model is not "over fit" such that it identifies graphical elements in the training data well, but does not generalize well to other images.

In some embodiments, it may not be known what accuracy level is possible for the AI/ML model to achieve. Accordingly, if the accuracy of the AI/ML model is starting to drop when analyzing the evaluation data (i.e., the model is performing well on the training data, but is starting to perform less well on the evaluation data), the AI/ML model may go through more epochs of training on the training data (and/or new training data). In some embodiments, the AI/ML model is only deployed if the accuracy reaches a certain level or if the accuracy of the trained AI/ML model is superior to an existing deployed AI/ML model.

In certain embodiments, a collection of trained AI/ML models may be used to accomplish a task, such as employing an AI/ML model for each type of graphical element of interest, employing an AI/ML model to perform OCR, deploying yet another AI/ML model to recognize proximity relationships between graphical elements, employing still another AI/ML model to generate an RPA workflow based on the outputs from the other AI/ML models, etc. This may collectively allow the AI/ML models to enable semantic automation, for instance.

Some embodiments may use transformer networks such as SentenceTransformers™, which is a Python™ framework for state-of-the-art sentence, text, and image embeddings. Such transformer networks learn associations of words and phrases that have both high scores and low scores. This trains the AI/ML model to determine what is close to the input and what is not, respectively. Rather than just using pairs of words/phrases, transformer networks may use the field length and field type, as well.

Figure 7:
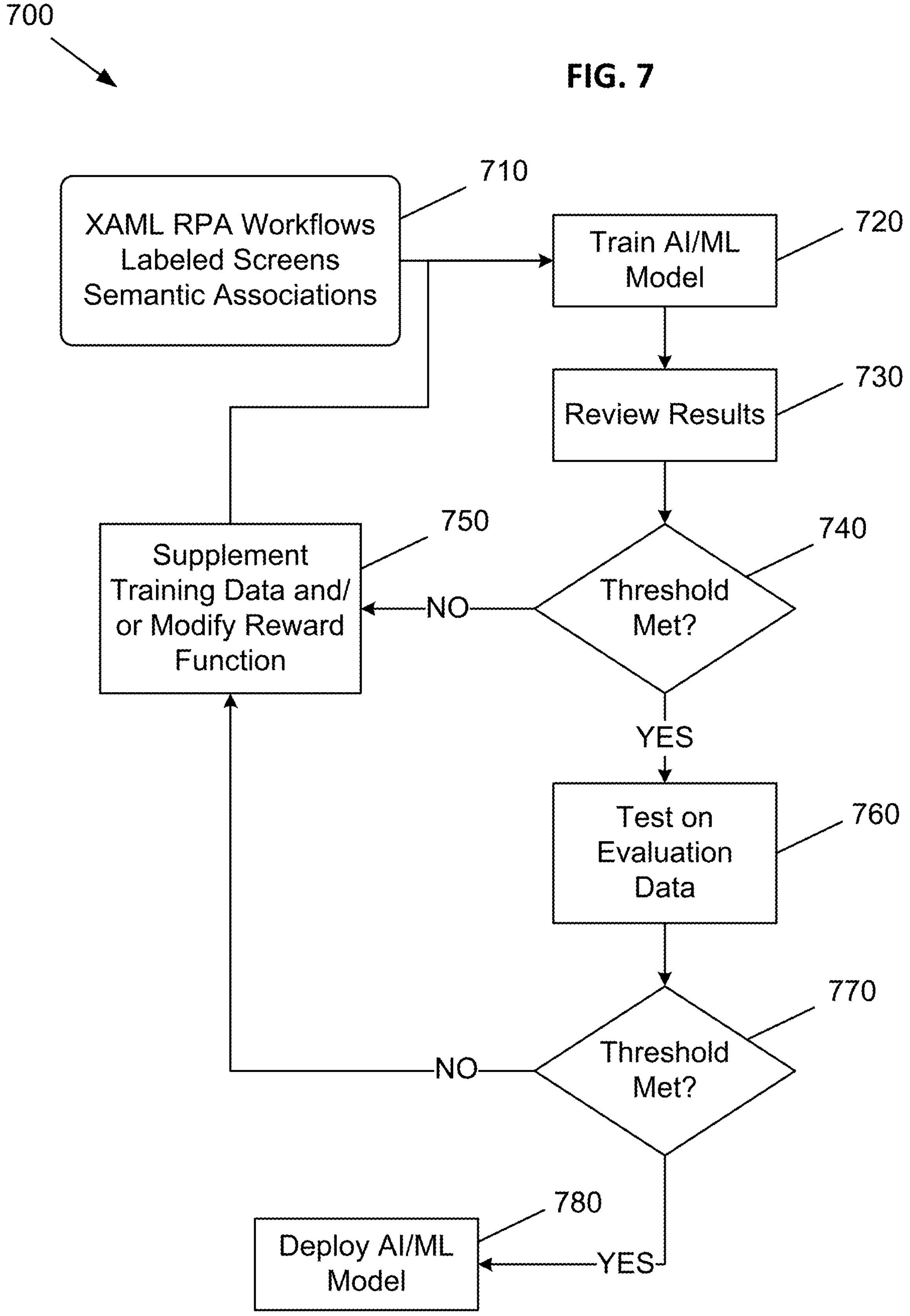
FIG. 7 is a flowchart illustrating a process for training AI/ML model(s), according to an embodiment of the present invention.

FIG. 7 is a flowchart illustrating a process 700 for training AI/ML model(s), according to an embodiment of the present invention. The process begins with providing training data, for instance, labeled data as shown in FIG. 7, such as labeled screens (e.g., with graphical elements and text identified), words and phrases, a "thesaurus" of semantic associations between words and phrases such that similar words and phrases for a given word or phrase can be identified, etc. at 710. The nature of the training data that is provided will depend on the objective that the AI/ML model is intended to achieve. The AI/ML model is then trained over multiple epochs at 720 and results are reviewed at 730.

If the AI/ML model fails to meet a desired confidence threshold at 740, the training data is supplemented and/or the reward function is modified to help the AI/ML model achieve its objectives better at 750 and the process returns to step 720. If the AI/ML model meets the confidence threshold at 740, the AI/ML model is tested on evaluation data at 760 to ensure that the AI/ML model generalizes well and that the AI/ML model is not over fit with respect to the training data. The evaluation data may include screens, source data, etc. that the AI/ML model has not processed before. If the confidence threshold is met at 770 for the evaluation data, the AI/ML model is deployed at 780. If not, the process returns to step 750 and the AI/ML model is trained further.

Figure 8:
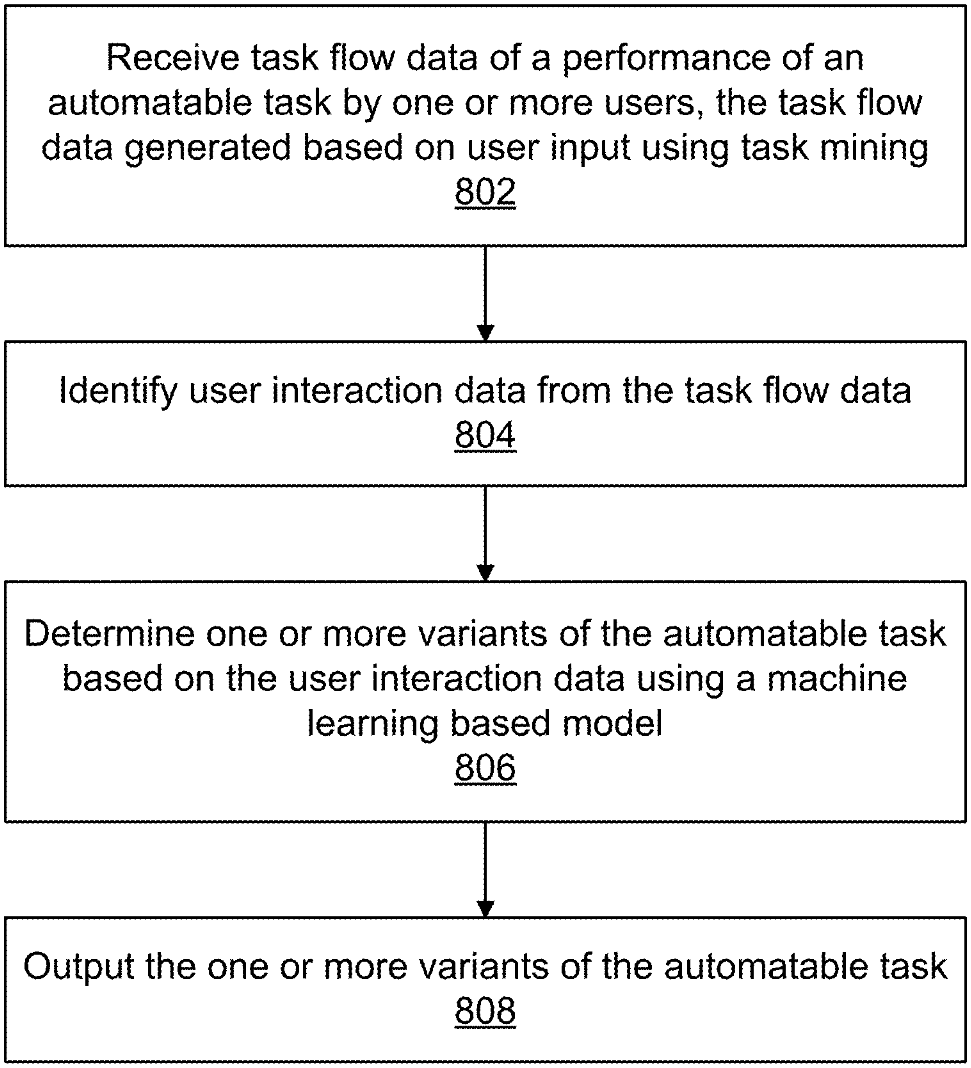
FIG. 8 shows a method for determining variants of an automatable task, in accordance with one or more embodiments.
Figure 9:
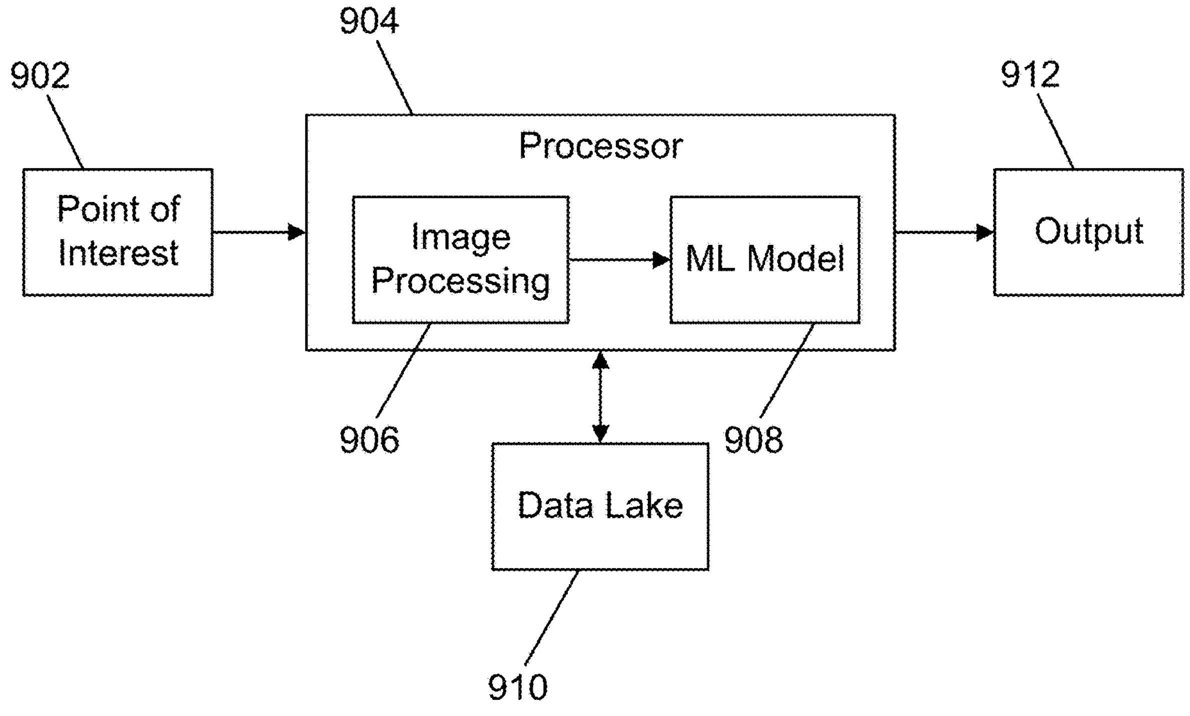
FIG. 9 shows a system architecture of a system for determining variants of an automatable task, in accordance with one or more embodiments.

FIG. 8 shows a method 800 for determining variants of an automatable task, in accordance with one or more embodiments. The steps of method 800 may be performed by one or more suitable computing devices, such as, e.g., computing system 500 of FIG. 5. FIG. 9 shows a system architecture 900 of a system for determining variants of an automatable task, in accordance with one or more embodiments. FIGS. 8 and 9 will be described together.

At step 802 of FIG. 8, task flow data of a performance of an automatable task by one or more users is received. The task flow data may comprise any data relating to the performance of the automatable task by the one or more users. In one embodiment, the task flow data comprises one or more sequences of screenshots depicting interactions with a user interface by the one or more users as the one or more users performs the automatable task. Such interactions may comprise, for example, mouse click locations, keyboard inputs, application windows and graphical elements the user was interacting with, timestamps for the interactions, etc. A sequence of screenshots is also referred to herein as a point of interest. In one example, as shown in system architecture 900 of FIG. 9, the task flow data is point of interest 902.

Figure 10A:
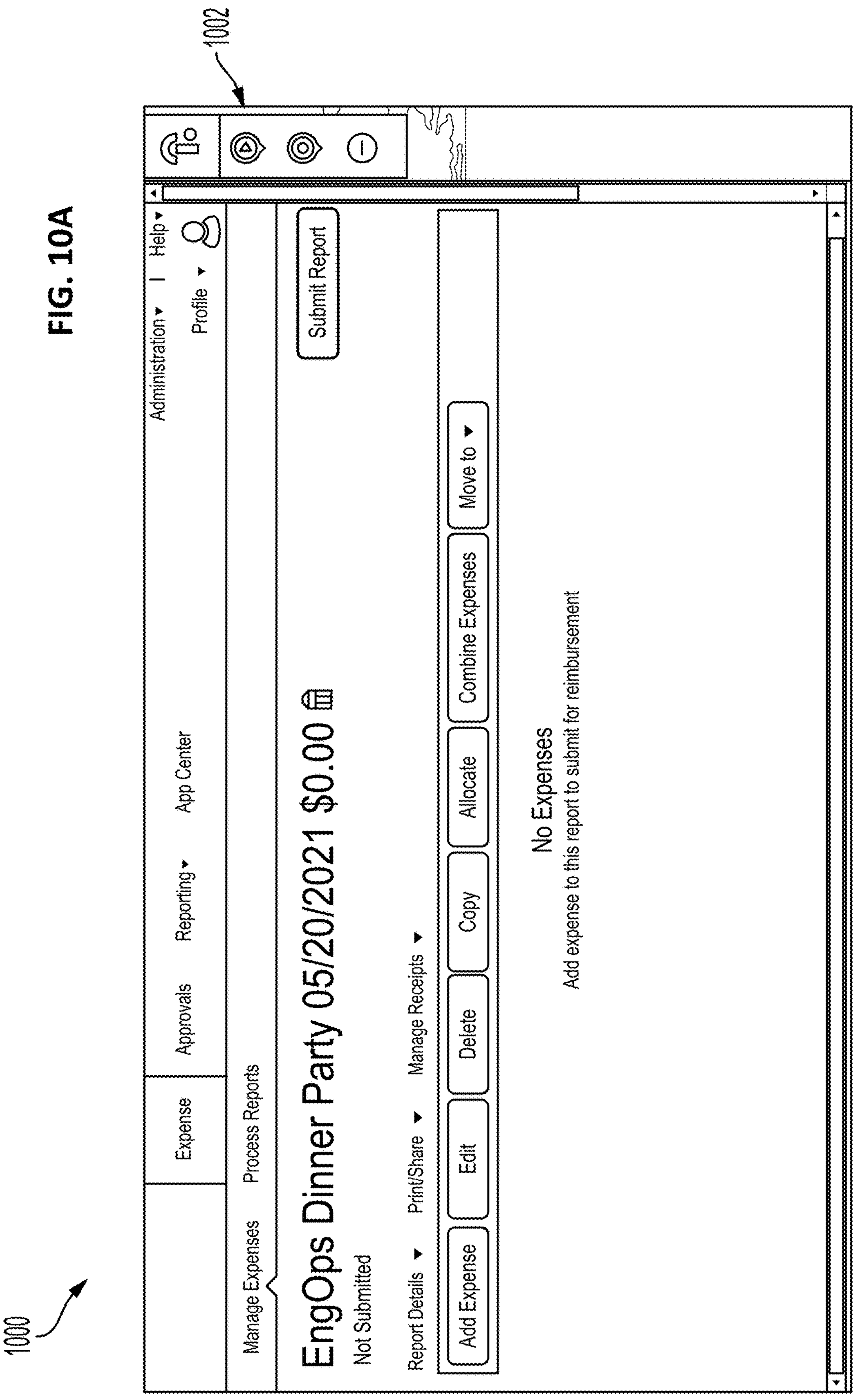
FIGS. 10A-10C show user interfaces for generating task flow data using task mining with user input to define start and stop points, in accordance with one or more embodiments.
Figure 10B:
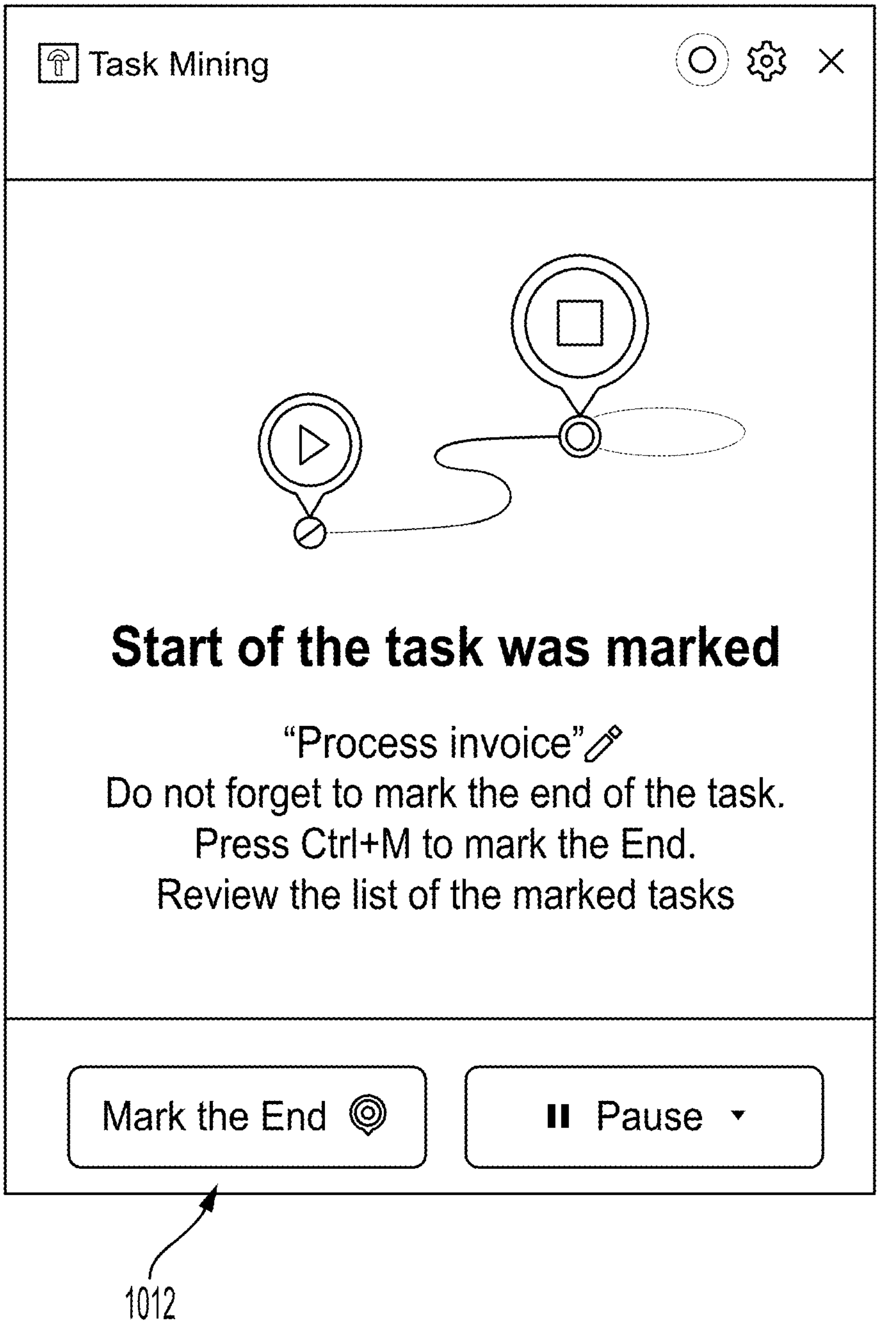
Figure 10C:
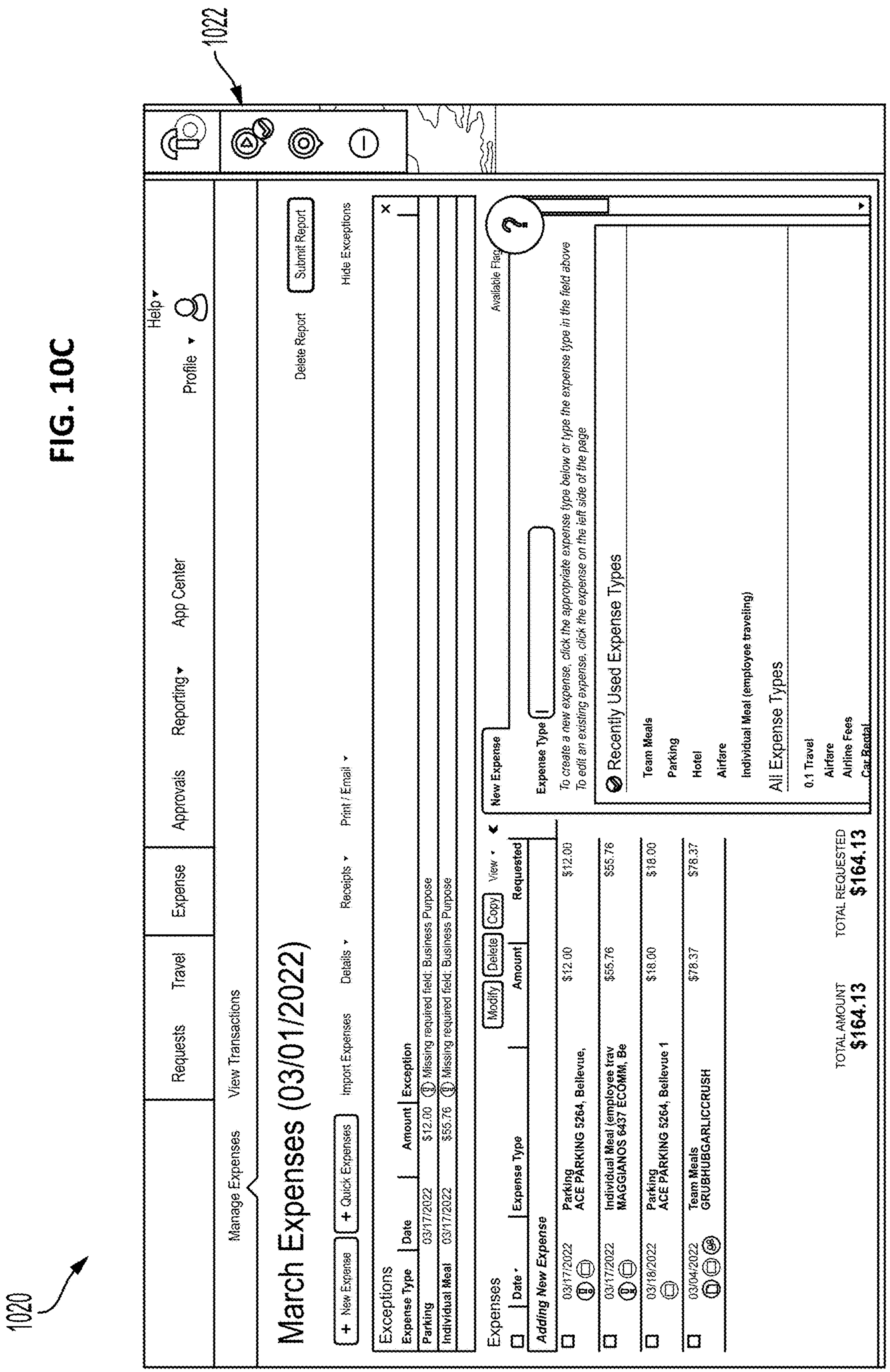

The task flow data is generated based on user input using task mining. In one embodiment, the task flow data is generated using both task capture and task mining. In this embodiment, the one or more users manually record performance of the automatable task using task capture and the recorded performance is further processed using task mining to generate one or more points of interest. In another embodiment, the task flow data is generated using task mining with user input to define start and stop points. In this embodiment, as shown in FIGS. 10A-10C in accordance with embodiments described herein, the user starts performance of task mining, e.g., by clicking on a start button 1002 in user interface 1000 of FIG. 10A, the user performs the automatable task while task mining is performed, and the user stops performance of the task mining, e.g., by clicking on a stop button 1012 in user interface 1010 of FIG. 10B to generate one or more points of interest. FIG. 10C shows a user interface 1020 with start button 1022 showing the point of interest being successfully marked.

In one embodiment, the beginning and ending events of the automatable task may be automatically or semi-automatically identified. Given that the same action or event can have different purpose based on its context, it is difficult to classify it as a beginning or ending event. Therefore, actions that have a statistically significant next action become candidates for being the beginning event. Given the beginning event, a set of actions or events is identified that has statistical significance in occurrence given that the beginning event has occurred. The action or event with most frequent occurrence as the last step prior to the next occurrence of a beginning event is identified as the ending event. The beginning and ending events may be further filtered by examining the entropy of prefix values for the beginning event (the beginning event should not have defined previous steps) and the entropy of suffix values for the ending event.

The task flow data may be received directly as the task flow data is being generated, or can be received by loading previously generated task flow data from a storage or memory of a computer system or receiving previously generated task flow data that have been transmitted from a remote computer system.

At step 804 of FIG. 8, user interaction data is identified from the task flow data. The user interaction data may comprise any data relating to the interaction of a user interface by the one or more users for the performance of the automatable task. In one embodiment, the user interaction data comprises 1) unique screenshots captured during the performance of the automatable task by the one or more users, 2) paths between the unique screenshots taken by the one or more users while the one or more users interacts with the user interface for the performance of the automatable task, and 3) actions by the one or more users during the performance of the automatable task.

The user interaction data may be generated using any suitable approach. In one embodiment, the user interaction data is generated based on the task flow data using image processing and one or more machine learning based models. In one example, as shown in system architecture 900 of FIG. 9, user interaction data is generated by image processing 906 executed by processor 904. Image processing 906 applies image processing techniques, such as, e.g., optical character recognition (OCR) and computer vision (CV), to perform screen de-duplication and path and action detection for generating the user interaction data. The user interaction data is stored in data lake 910 (e.g., a database).

In screen de-duplication, the task flow data is analyzed to identify unique screenshots captured during the performance of the automatable task by the one or more users. In path and action detection, paths between the unique screenshots taken by the one or more users while the one or more users interacts with the user interface for the performance of the automatable task and actions by the one or more users during the performance of the automatable task are determined. Such actions may include, for example, mouse click locations, keyboard inputs, application windows and graphical elements the user was interacting with, timestamps for the interactions, etc. In one embodiment, screen de-duplication and path and action detection are performed by 1) extracting OCR and computer vision data on each screenshot, 2) clustering similar screenshots based on the extracted OCR and computer vision data and metadata associated with the screenshots (e.g., application name, uniform resource locator, etc.), and 3) following a path from one screenshot to another screenshot and determining a statistical likelihood that this was an intentional transition. The actions represent a single screenshot, which are collected based on user interaction (e.g., when a user clicks or scrolls). The paths and actions are determined only from the unique screenshots without using any log data.

At step 806 of FIG. 8, one or more variants of the automatable task are determined based on the user interaction data using a machine learning (ML) based model. In one example, as shown in system architecture 900 of FIG. 9, variants of the automatable tasks are determined by ML model 908, executed by processor 904, based on user interaction data generated by image processing 906. ML model 908 receives as input the user interaction data (e.g., the extracted OCR and computer vision data, the unique screenshots, the paths, and the actions) stored in data lake 910 and generates as output variants of the automatable task. In one embodiment, ML model 908 extracts an embedding representation from the user interaction data corresponding to a sequence of actions (not just an individual action) of the automatable task. A relative distance between the embedding representation and other sequences is calculated and the sequences are clustered based on the relative distance. The one or more variants of the automatable task are determined based on the clusters. For example, the one or more variants may be determined as sequences of actions that are clustered with the embedding representation.

ML model 908 may be any suitable machine learning based model for determining variants of the automatable task. In one example, ML model 908 may be a neural network, such as neural network 600 of FIG. 6A. ML model 908 is trained during a prior offline or training stage using training user interaction data. In one example, ML model 908 is trained according to process 700 of FIG. 7. Once trained, the trained ML model 908 is applied during an online or inference stage, for example, to perform step 806 of FIG. 8.

In one embodiment, ML model 908 additionally generates as output analytical measures of interest associated with the performance of the automatable task and the variants of the automatable task. For example, the analytical measures may comprise the number of times the automatable task and variants of the automatable task are performed, the number of users that performs the automatable task and the variants of the automatable task, steps and actions involved in performing the automatable task and the variants of the automatable task, an estimated average time to complete the automatable task and the variants of the automatable task, etc.

At step 808 of FIG. 8, the one or more variants of the automatable task and/or the analytical measures are output. In one example, as shown in system architecture 900 of FIG. 9, the variants of the automatable task and/or the analytical measures are output as output 912. The variants of the automatable task and/or the analytical measures may be output by, for example, displaying the variants of the automatable task and/or the analytical measures on a display device of a computer system or by storing the variants of the automatable task and/or the analytical measures on a memory or storage of a computer system.

In one embodiment, one or more of the automatable task and the variants of the automatable task are automatically performed, for example, using RPA.

Advantageously, embodiments described herein bridge the gap between task capture and task mining by incorporating user input into the task mining process to generate the task flow data. Such task flow data may be used to determine variants of an automatable task, as well as analytical measures associated with the performance of the automatable task and the variants of the automatable task. Embodiments described herein allow users to direct the search of information and enable the discovery of unknown variations.

Figure 11:
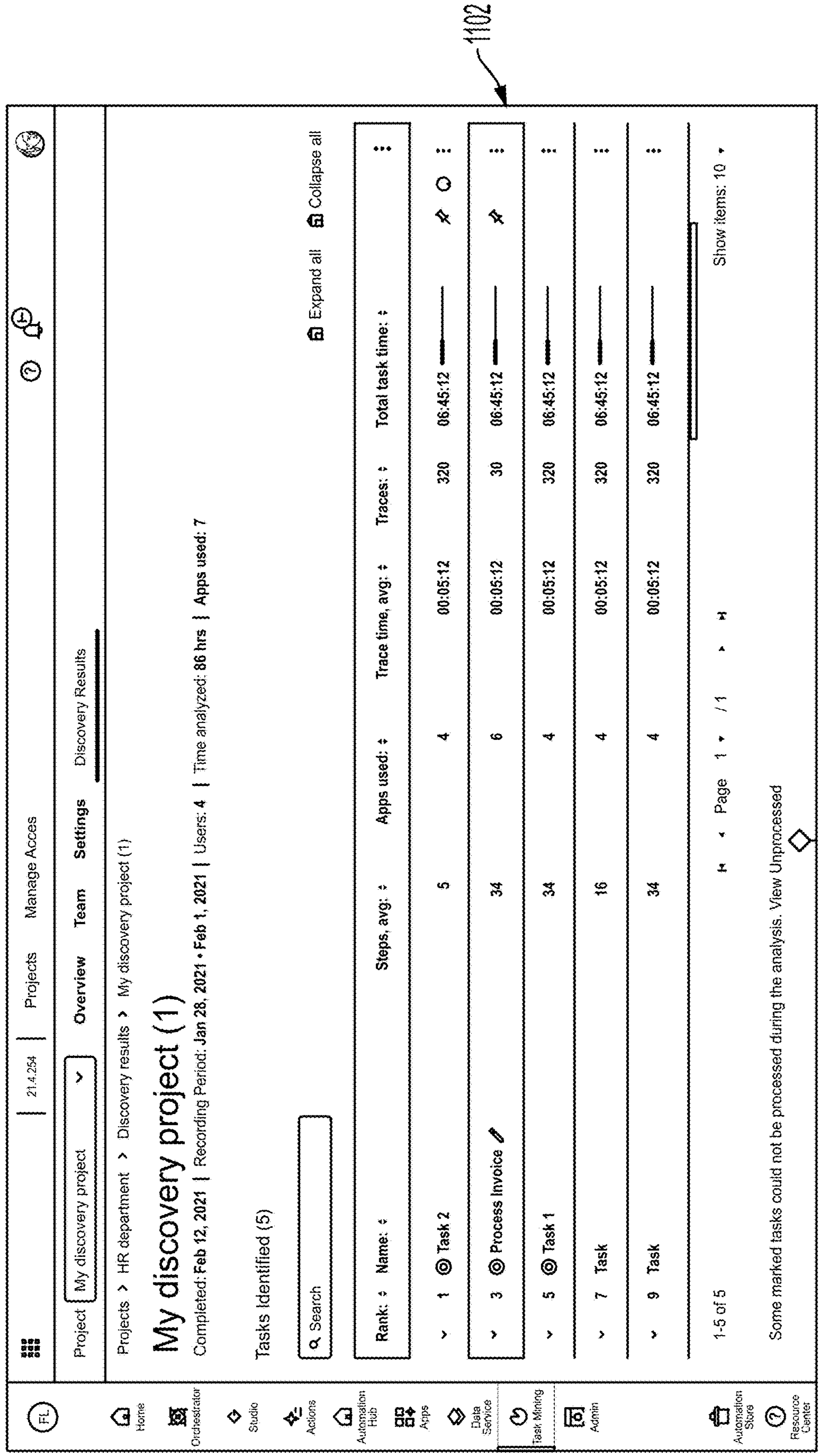
FIG. 11 shows a user interface for displaying automatable tasks, in accordance with one or more embodiments.
Figure 12:
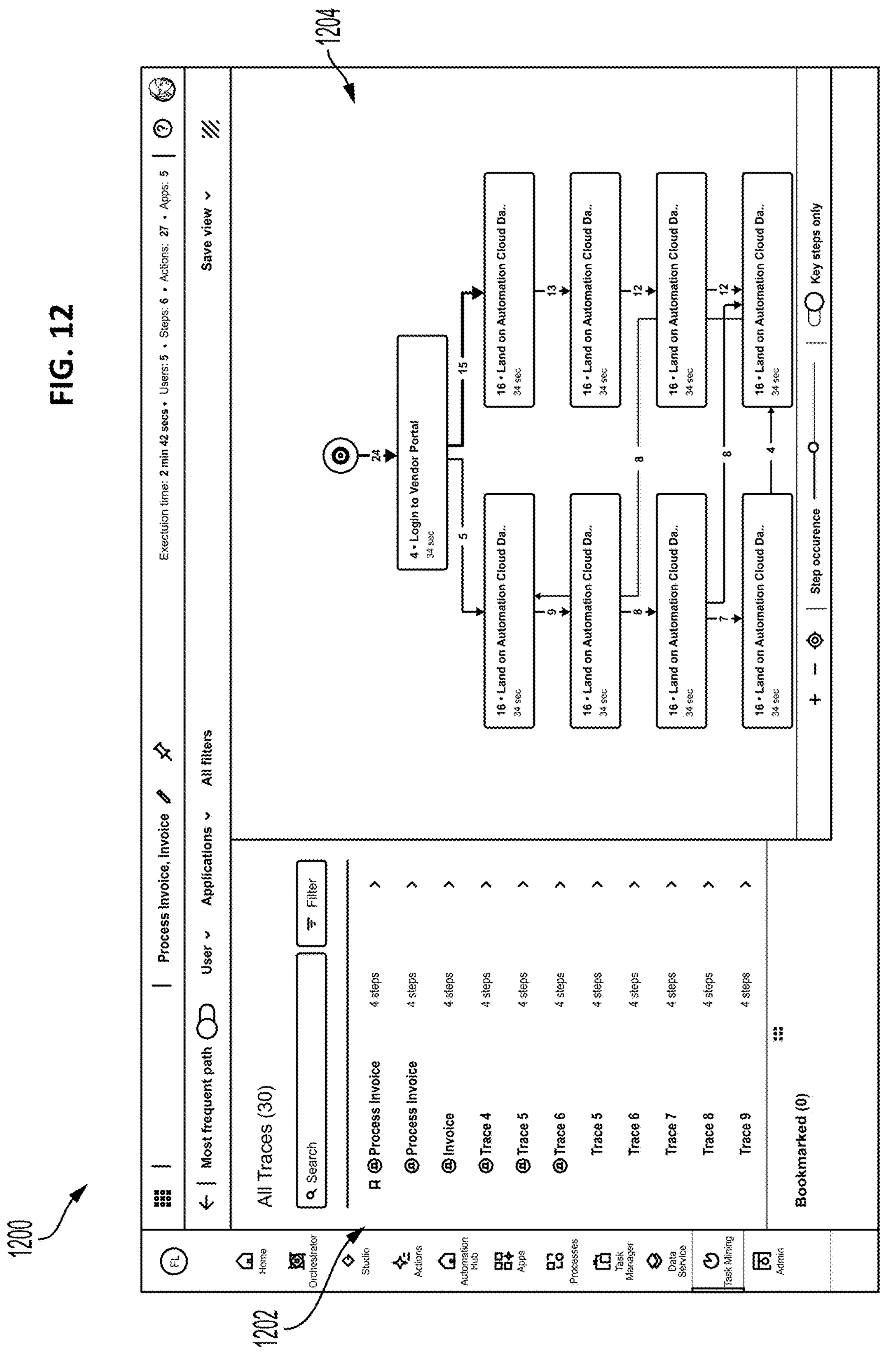
FIG. 12 shows a user interface for displaying variants of an automatable task, in accordance with one or more embodiments.

In one exemplary application of embodiments described herein, a finance team of a corporation may be responsible for processing an invoice. The finance team must perform a sequence of steps to complete invoice processing. The finance team can record the invoice processing task using task capture and the recording can be further processed to generate task flow data. The task flow data may be processed by image processing and using a ML model to determine variants of the invoice processing task. FIG. 11 shows a user interface 1100 for displaying automatable tasks, in accordance with one or more embodiments. User interface 1100 shows automatable tasks, as well as analytical measures associated with the automatable tasks. The automatable tasks may comprise, for example, automatable tasks discovered via user input (discovery of the known), automatable tasks automatically discovered, e.g., via machine learning (discovery of the unknown), and variants of automatable tasks, e.g., discovered via method 800 of FIG. 8 (discovery of variants for the known). As shown in FIG. 11, user interface 1100 shows analytical measures such as, e.g., average number of steps, number of applications used, average trace time, number of traces, and total task time. A user may select process invoice task 1102 and, in response, the variants of the process invoice task 1102 are displayed. FIG. 12 shows a user interface 1200 for displaying variants of an automatable task, in accordance with one or more embodiments. User interface 1200 shows traces 1202 of automatable tasks. A user may select a trace 1202 of an automatable task and, in response, a visualization 1204 of the selected trace 1202 of the automatable task and the variants of the automatable task are displayed.

The process steps performed in FIGS. 7-8 may be performed by a computer program, encoding instructions for the processor(s) to perform at least part of the process(es) described in FIGS. 7-8, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 7-8, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method comprising:

receiving task flow data of a performance of an automatable task by one or more users, the task flow data generated based on user input defining start and stop points of the automatable task using at least one of task mining or task capture;

identifying user interaction data from the task flow data;

determining one or more variants of the automatable task based on the user interaction data using a machine learning based model, the machine learning based model:

receiving as input the user interaction data, extracting an embedding representation corresponding to a sequence of actions from the user interaction data, clustering the embedding representation with other sequences of actions, and generating as output the other sequences of actions that are clustered with the embedding representation as the one or more variants of the automatable task; and outputting the one or more variants of the automatable task.

2. The computer-implemented method of claim 1, further comprising generating the task flow data by:

recording the performance of the automatable task by the one or more users using task capture; and processing the recorded performance using task mining to generate the task flow data.

3. The computer-implemented method of claim 1, wherein the task flow data comprises one or more sequences of screenshots depicting interactions with a user interface by the one or more users.

4. The computer-implemented method of claim 1, wherein identifying user interaction data from the task flow data comprises:

identifying, from the task flow data, 1) unique screenshots captured during the performance of the automatable task by the one or more users, 2) paths between the unique screenshots taken by the one or more users while the one or more users interacts with the user interface for the performance of the automatable task, and 3) actions by the one or more users during the performance of the automatable task.

5. The computer-implemented method of claim 1, wherein identifying user interaction data from the task flow data comprises:

identifying the user interaction data from the task flow data based on optical character recognition and computer vision.

6. The computer-implemented method of claim 1, further comprising:

determining measures of interest associated with the performance of the automatable task and the one or more variants of the automatable task based on the user interaction data using a machine learning based model.

7. The computer-implemented method of claim 6, wherein the measures of interest comprise one or more of a number of times the automatable task and the one or more variants of the automatable task are performed, a number of users that performs the automatable task and the one or more variants of the automatable task, steps and actions involved in performing the automatable task and the one or more variants of the automatable task, or an estimated average time to complete the automatable task and the one or more variants of the automatable task.

8. The computer-implemented method of claim 1, further comprising:

automatically performing one or more of the automatable task and the one or more variants of the automatable task using robotic process automation.

9. A system comprising:

a memory storing computer program instructions; and at least one processor configured to execute the computer program instructions, the computer program instructions configured to cause the at least one processor to perform operations of:

receiving task flow data of a performance of an automatable task by one or more users, the task flow data generated based on user input defining start and stop points of the automatable task using at least one of task mining or task capture;

identifying user interaction data from the task flow data;

determining one or more variants of the automatable task based on the user interaction data using a machine learning based model, the machine learning based model:

receiving as input the user interaction data, extracting an embedding representation corresponding to a sequence of actions from the user interaction data, clustering the embedding representation with other sequences of actions, and generating as output the other sequences of actions that are clustered with the embedding representation as the one or more variants of the automatable task; and outputting the one or more variants of the automatable task.

10. The system of claim 9, the operations further comprising generating the task flow data by:

recording the performance of the automatable task by the one or more users using task capture; and processing the recorded performance using task mining to generate the task flow data.

11. The system of claim 9, wherein the task flow data comprises one or more sequences of screenshots depicting interactions with a user interface by the one or more users.

12. The system of claim 9, wherein identifying user interaction data from the task flow data comprises:

identifying, from the task flow data, 1) unique screenshots captured during the performance of the automatable task by the one or more users, 2) paths between the unique screenshots taken by the one or more users while the one or more users interacts with the user interface for the performance of the automatable task, and 3) actions by the one or more users during the performance of the automatable task.

13. A non-transitory computer-readable medium storing computer program instructions, the computer program instructions, when executed on at least one processor, cause the at least one processor to perform operations comprising:

receiving task flow data of a performance of an automatable task by one or more users, the task flow data generated based on user input defining start and stop points of the automatable task using at least one of task mining or task capture;

identifying user interaction data from the task flow data;

determining one or more variants of the automatable task based on the user interaction data using a machine learning based model, the machine learning based model:

receiving as input the user interaction data, extracting an embedding representation corresponding to a sequence of actions from the user interaction data, clustering the embedding representation with other sequences of actions, and generating as output the other sequences of actions that are clustered with the embedding representation as the one or more variants of the automatable task; and outputting the one or more variants of the automatable task.

14. The non-transitory computer-readable medium of claim 13, the operations further comprising generating the task flow data by:

recording the performance of the automatable task by the one or more users using task capture; and processing the recorded performance using task mining to generate the task flow data.

15. The non-transitory computer-readable medium of claim 13, wherein identifying user interaction data from the task flow data comprises:

identifying the user interaction data from the task flow data based on optical character recognition and computer vision.

16. The non-transitory computer-readable medium of claim 13, the operations further comprising:

determining measures of interest associated with the performance of the automatable task and the one or more variants of the automatable task based on the user interaction data using a machine learning based model.

17. The non-transitory computer-readable medium of claim 16, wherein the measures of interest comprise one or more of a number of times the automatable task and the one or more variants of the automatable task are performed, a number of users that performs the automatable task and the one or more variants of the automatable task, steps and actions involved in performing the automatable task and the one or more variants of the automatable task, or an estimated average time to complete the automatable task and the one or more variants of the automatable task.

18. The non-transitory computer-readable medium of claim 13, the operations further comprising:

automatically performing one or more of the automatable task and the one or more variants of the automatable task using robotic process automation.

* * * * *